US010469784B2

(12) United States Patent
Tate

(10) Patent No.: US 10,469,784 B2
(45) Date of Patent: Nov. 5, 2019

(54) CONTROL DEVICE, CONTROL METHOD, AND SOLID-STATE IMAGING DEVICE FOR GENERATING SHUTTER ROW ADDRESSES

(71) Applicant: SONY SEMICONDUCTOR SOLUTIONS CORPORATION, Kanagawa (JP)

(72) Inventor: Tomoyasu Tate, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/503,106

(22) PCT Filed: Aug. 14, 2015

(86) PCT No.: PCT/JP2015/072951
§ 371 (c)(1),
(2) Date: Feb. 10, 2017

(87) PCT Pub. No.: WO2016/031596
PCT Pub. Date: Mar. 3, 2016

(65) Prior Publication Data
US 2017/0257589 A1    Sep. 7, 2017

(30) Foreign Application Priority Data
Aug. 26, 2014 (JP) .................................. 2014-171518

(51) Int. Cl.
*H04N 5/376* (2011.01)
*H04N 5/353* (2011.01)
(Continued)

(52) U.S. Cl.
CPC ............. *H04N 5/376* (2013.01); *H04N 5/353* (2013.01); *H04N 5/374* (2013.01); *H04N 5/378* (2013.01)

(58) Field of Classification Search
CPC ......... H04N 5/376; H04N 5/353; H04N 5/378
See application file for complete search history.

(56) References Cited

U.S. PATENT DOCUMENTS

2006/0237721 A1* 10/2006 Muramatsu .......... H04N 5/3454
257/59
2009/0109312 A1* 4/2009 Noda ................. H04N 5/23248
348/304
(Continued)

FOREIGN PATENT DOCUMENTS

JP          9-23382 A     1/1997
JP     2008-288903 A    11/2008
(Continued)

OTHER PUBLICATIONS

International Search Report prepared by the Japan Patent Office dated Oct. 15, 2015, for International Application No. PCT/JP2015/072951.

(Continued)

*Primary Examiner* — Nicholas G Giles
(74) *Attorney, Agent, or Firm* — Sheridan Ross P.C.

(57) ABSTRACT

The present disclosure relates to a control device, a control method, and a solid-state imaging device that enable a larger number of shutter row addresses to be set at the same time. A vertical selection decoder and a latch circuit set shutter row addresses that identify rows of pixels for which an electronic shutter operation is performed, of pixels arranged in a matrix manner, on the basis of a start address and an end address of the shutter row addresses. The present disclosure is applicable to, for example, a CMOS image sensor that sets the shutter row addresses.

9 Claims, 30 Drawing Sheets

(51) Int. Cl.
    *H04N 5/374*    (2011.01)
    *H04N 5/378*    (2011.01)

(56) References Cited

U.S. PATENT DOCUMENTS

2010/0085458 A1* 4/2010 Horiguchi ............ H04N 5/3454
                                                    348/308
2012/0199724 A1* 8/2012 Nomura ............... H04N 5/3454
                                                    250/208.1

FOREIGN PATENT DOCUMENTS

JP          2009-232174 A      10/2009
JP          2011-101273 A       5/2011

OTHER PUBLICATIONS

Official Action (with English translation) for Chinese Patent Application No. 201580044006.1, dated May 7, 2019, 14 pages.
Official Action (no English translation available) for Japanese Patent Application No, 2016-545442, dated Aug, 27, 2019, 5 pages.

* cited by examiner

CONTROL DEVICE, CONTROL METHOD, AND SOLID-STATE IMAGING DEVICE FOR GENERATING SHUTTER ROW ADDRESSES

CROSS REFERENCE TO RELATED APPLICATIONS

This application is a national stage application under 35 U.S.C. 371 and claims the benefit of PCT Application No. PCT/JP2015/072951 having an international filing date of 14 Aug. 2015, which designated the United States, which PCT application claimed the benefit of Japanese Patent Application No. 2014-171518 filed 26 Aug. 2014, the disclosures of which are incorporated herein by reference in their entirety.

TECHNICAL FIELD

The present disclosure relates to a control device, a control method, and a solid-state imaging device, and especially relates to a control device, a control method, and a solid-state imaging device that enable a larger number of shutter row addresses to be set at the same time.

BACKGROUND ART

In solid-state imaging devices such as digital still cameras, an output of a high-quality captured image at a high frame rate is required. However, if imaging is performed at a high frame rate such as 1000 images per second in a solid-state imaging device in which 10 million or more pixels are integrated, a time to read an electrical signal of an accumulated electric charge cannot be sufficiently secured, and a low-quality captured image is output. Therefore, such a solid-state imaging device sufficiently secures the time to read electrical signal and improves the quality of the captured image to be output, by thinning out the electrical signals of the integrated pixels and reading the electrical signals.

In this case, a pixel to be thinned is irradiated with light, and thus the electric charge is continuously accumulated in a photodiode of the pixel to be thinned. Then, if the amount of the electric charge accumulated in the photodiode of the pixel to be thinned exceeds an accumulatable amount, the electric charge overflows to an adjacent pixel (blooming occurs). Accordingly, a photodiode of the pixel adjacent to the pixel to be thinned accumulates not only the electric charge that is primarily accumulated but also the electric charge overflowing from the pixel to be thinned. As a result, in a case where the electrical signal of the electric charge accumulated in the pixel adjacent to the pixel to be thinned is read as a captured image, the quality of the captured image is decreased.

Therefore, suppression of an influence of the electric charge overflowing from the pixel to be thinned, in the pixel from which the electrical signal is read, by performing an electronic shutter operation in the pixel to be thinned adjacent to the pixel from which the electrical signal is read is devised (for example, see Patent Document 1).

At this time, in a complementary metal-oxide semiconductor (CMOS) image sensor described in Patent Document 1, four shutter row addresses that identify rows of pixels for which the electronic shutter operation is performed are set at the same time, and the time to set shutter row addresses is shortened.

CITATION LIST

Patent Document

Patent Document 1: Japanese Patent Application Laid-Open No. 2008-288903

SUMMARY OF THE INVENTION

Problems to be Solved by the Invention

However, considering further demands of an increase in the number of pixels and a higher frame rate in the future, setting a larger number of shutter row addresses at the same time is desirable.

The present disclosure has been made in view of the foregoing, and enables setting of a larger number of shutter row addresses at the same time.

Solutions to Problems

A control device of a first aspect of the present disclosure includes: an address setting unit configured to set shutter row addresses that identify rows of pixels for which an electronic shutter operation is performed, of pixels arranged in a matrix manner, on the basis of a start address and an end address of the shutter row addresses.

A control method of the first aspect of the present disclosure corresponds to the control device of the first aspect of the present disclosure.

In the first aspect of the present disclosure, the shutter row addresses that identify rows of pixels for which an electronic shutter operation is performed, of the pixels arranged in a matrix manner, are set on the basis of the start address and the end address of the shutter row addresses.

A solid-state imaging device of a second aspect of the present disclosure includes: pixels arranged in a matrix manner; and an address setting unit configured to set shutter row addresses that identify rows of pixels for which an electronic shutter operation is performed, of the pixels arranged in a matrix manner, on the basis of a start address and an end address of the shutter row addresses.

In the second aspect of the present disclosure, the pixels arranged in a matrix manner, and the address setting unit that sets the shutter row addresses that identify rows of pixels for which an electronic shutter operation is performed, of the pixels arranged in a matrix manner, on the basis of the start address and the end address of the shutter row addresses, are provided.

Effects of the Invention

According to the first and second aspects of the present disclosure, imaging can be controlled. Further, according to the first and second aspects of the present disclosure, a larger number of shutter row addresses can be set at the same time.

Note that the effects described here are not necessarily limited, and any effect described in the present disclosure may be exhibited.

MODE FOR CARRYING OUT THE INVENTION

Hereinafter, the presupposition of the present disclosure and forms for implementing the present disclosure (hereinafter, referred to as embodiments) will be described. Note that the description will be given in the order below.

0. Presupposition of Present Disclosure (FIGS. 1 to 6)
1. First Embodiment: CMOS Image Sensor (FIGS. 7 to 16)
2. Second Embodiment: CMOS Image Sensor (FIGS. 17 and 18)
3. Third Embodiment: CMOS Image Sensor (FIG. 19)
4. Fourth Embodiment: CMOS Image Sensor (FIGS. 20 to 29)
5. Fifth Embodiment: Solid-state Imaging Device (FIG. 30)

<Presupposition of Present Disclosure>
(Example of CMOS Image Sensor)

Figure 1:
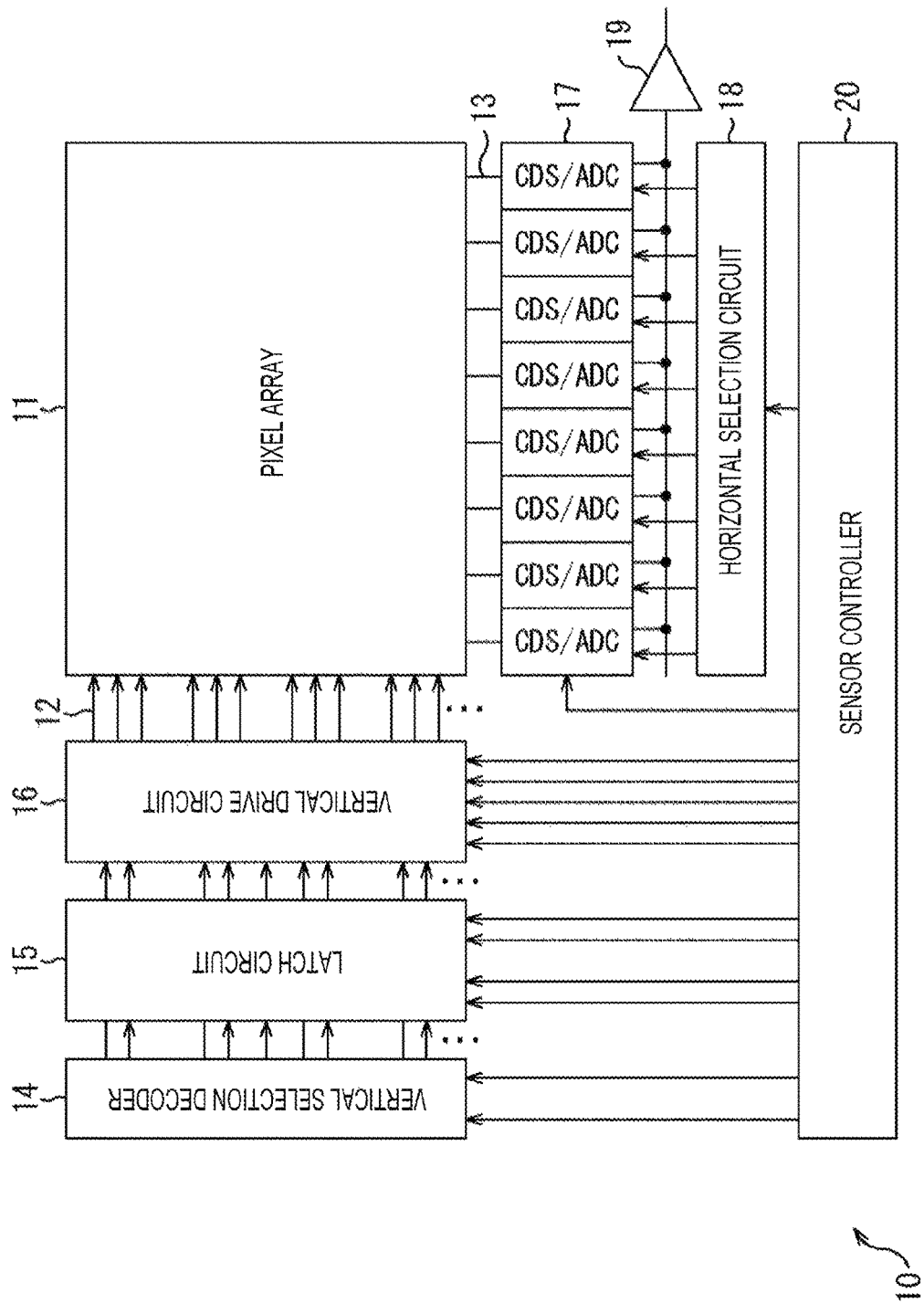
FIG. 1 is a diagram illustrating an example of a CMOS image sensor.

FIG. 1 is a diagram illustrating an example of a CMOS image sensor that performs an electronic shutter operation for pixels to be thinned when thinning out and reading electrical signals of pixels.

A CMOS image sensor 10 of FIG. 1 is configured from a pixel array 11, a horizontal selection line 12, a vertical signal line 13, a vertical selection decoder 14, a latch circuit 15, a vertical drive circuit 16, a correlated double sampling (CDS)/analog digital converter (ADC) circuit 17, a horizontal selection circuit 18, an amplifier circuit 19, and a sensor controller 20.

A plurality of pixels is arranged in the pixel array 11 of the CMOS image sensor 10 in a two-dimensional array manner (in a matrix manner). The plurality of pixels arranged in a two-dimensional array manner is connected with the vertical drive circuit 16 in units of a row with the horizontal selection line 12, and is connected with the CDS/ADC circuit 17 in units of a column with the vertical signal line 13.

Each of the pixels includes a photodiode that generates and accumulates an electric charge corresponding to emitted light. Each of the pixels performs a reading operation to read the electric charge accumulated in the photodiode, and an electronic shutter operation to sweep the electric charge accumulated in the photodiode, according to various signals supplied through the horizontal selection line 12. The electrical signal of the electric charge read in the reading operation is supplied to the vertical signal line 13 as a pixel signal, and is supplied to the CDS/ADC circuit 17.

An ADR signal is supplied from the sensor controller 20 to the vertical selection decoder 14. The ADR signal is a signal that specifies a representative shutter row address as a representative of shutter row addresses and a reading row address in a time-division manner within one horizontal scanning period. Note that the shutter row address is an address that identifies a row of pixels for which the electronic shutter operation is performed, of the pixels arranged in the pixel array 11, and the reading row address is an address that identifies a row of pixels from which the pixel signals are read.

Further, an AREA_EN signal that makes simultaneous generation of a plurality of addresses valid is supplied from the sensor controller 20 to the vertical selection decoder 14. By setting the AREA_EN signal to 1 (ON) for a fixed period after termination of a transition of the ADR signal that specifies the representative shutter row address, generation of a wrong shutter row address based on the ADR signal at the time of the transition of the ADR signal can be prevented.

The vertical selection decoder 14 generates the shutter row address and the reading row address on the basis of the ADR signal and the AREA_EN signal, and supplies the generated addresses to the latch circuit 15.

An RLRST signal, an RLSET signal, an SLRST signal, and an SLSET signal are supplied from the sensor controller 20 to the latch circuit 15. The RLRST signal is a pulse signal for cancelling the reading row address held in the latch circuit 15, and the RLSET signal is a pulse signal for holding an address to be supplied to the latch circuit 15 as the reading row address. Further, the SLRST signal is a pulse signal for cancelling the shutter row address held in the latch circuit 15, and the SLSET signal is a pulse signal for holding an address to be supplied to the latch circuit 15 as the shutter row address.

The latch circuit 15 makes the held reading row address clear when the RLRST signal supplied from the sensor controller 20 is set to 1. Further, the latch circuit 15 holds the address supplied from the vertical selection decoder 14 as the reading row address when the RLSET signal supplied from the sensor controller 20 is set to 1. The latch circuit 15 sets the held reading row address to the current reading row address by supplying the held reading row address to the vertical drive circuit 16.

Further, the latch circuit 15 makes the held shutter row address clear when the SLRST signal supplied from the sensor controller 20 is set to 1. Further, the latch circuit 15 holds the address supplied from the vertical selection decoder 14 as the shutter row address when the SLSET signal supplied from the sensor controller 20 is set to 1. The latch circuit 15 sets the held shutter row address to the current shutter row address by supplying the held shutter row address to the vertical drive circuit 16.

An STRG signal, an SRST signal, an RTRG signal, an RRST signal, and an RSEL signal are supplied from the sensor controller 20 to the vertical drive circuit 16. The STRG signal and the SRST signal are signals that control a TRG signal and an RST signal to be supplied to the horizontal selection line 12 for the reading operation, respectively. Further, the RTRG signal, the RRST signal, and the RSEL signal are signals that control the TRG signal, the RST signal, and an SEL signal to be supplied to the horizontal selection line 12 for the electronic shutter operation, respectively.

The vertical drive circuit 16 generates the TRG signal of a row identified by a shutter selection row address on the basis of the shutter row address and the STRG signal supplied from the latch circuit 15, and generates the RST signal of the row on the basis of the shutter selection row address and the SRST signal. The vertical drive circuit 16 supplies the generated TRG signal and the generated RST signal of the row identified by the shutter selection row address to the horizontal selection line 12 of the row.

Further, the vertical drive circuit 16 generates the TRG signal of a row identified by the reading row address on the basis of the reading row address and the RTRG signal supplied from the latch circuit 15, and generates the RST signal of the row on the basis of the reading row address and the RRST signal. Further, the vertical drive circuit 16 generates the SEL signal of the row identified by the reading row address on the basis of the reading row address and the RSEL signal. The vertical drive circuit 16 supplies the generated TRG signal, the generated RST signal, and the generated SEL signal identified by the reading row address to the horizontal selection line 12 of the row.

The CDS/ADC circuit 17 is provided in every column of the pixels arranged in the pixel array 11, and is controlled by the sensor controller 20. The CDS/ADC circuit 17 performs correlated double sampling for the pixel signal read in the reading operation of the pixels of the row identified by the reading row address and supplied through the vertical signal line 13 to decrease a noise of the pixel signal. Further, the CDS/ADC circuit 17 converts the pixel signal obtained as a result of the correlated double sampling into a digital signal. The CDS/ADC circuit 17 supplies the pixel signal converted into the digital signal to the amplifier circuit 19 on the basis of a selection signal supplied from the horizontal selection circuit 18.

The horizontal selection circuit 18 sequentially selects the CDS/ADC circuits 17 according to a horizontal drive signal supplied from the sensor controller 20, and supplies the selection signal to the selected CDS/ADC circuit 17. The amplifier circuit 19 amplifies and outputs the pixel signal supplied from the CDS/ADC circuit 17.

The sensor controller 20 controls imaging by the CMOS image sensor 10 by generating various signals. To be specific, the sensor controller 20 generates the ADR signal and the AREA_EN signal, and supplies the generated signals to the vertical selection decoder 14. Further, the sensor controller 20 generates the RLRST signal, the RLSET signal, the SLRST signal, and the SLSET signal, and supplies the generated signals to the latch circuit 15. Further, the sensor controller 20 generates the STRG signal, the SRST signal, the RTRG signal, the RRST signal, and the RSEL signal, and supplies the generated signals to the vertical drive circuit 16.

(Circuit Configuration Example of Pixel)

Figure 2:
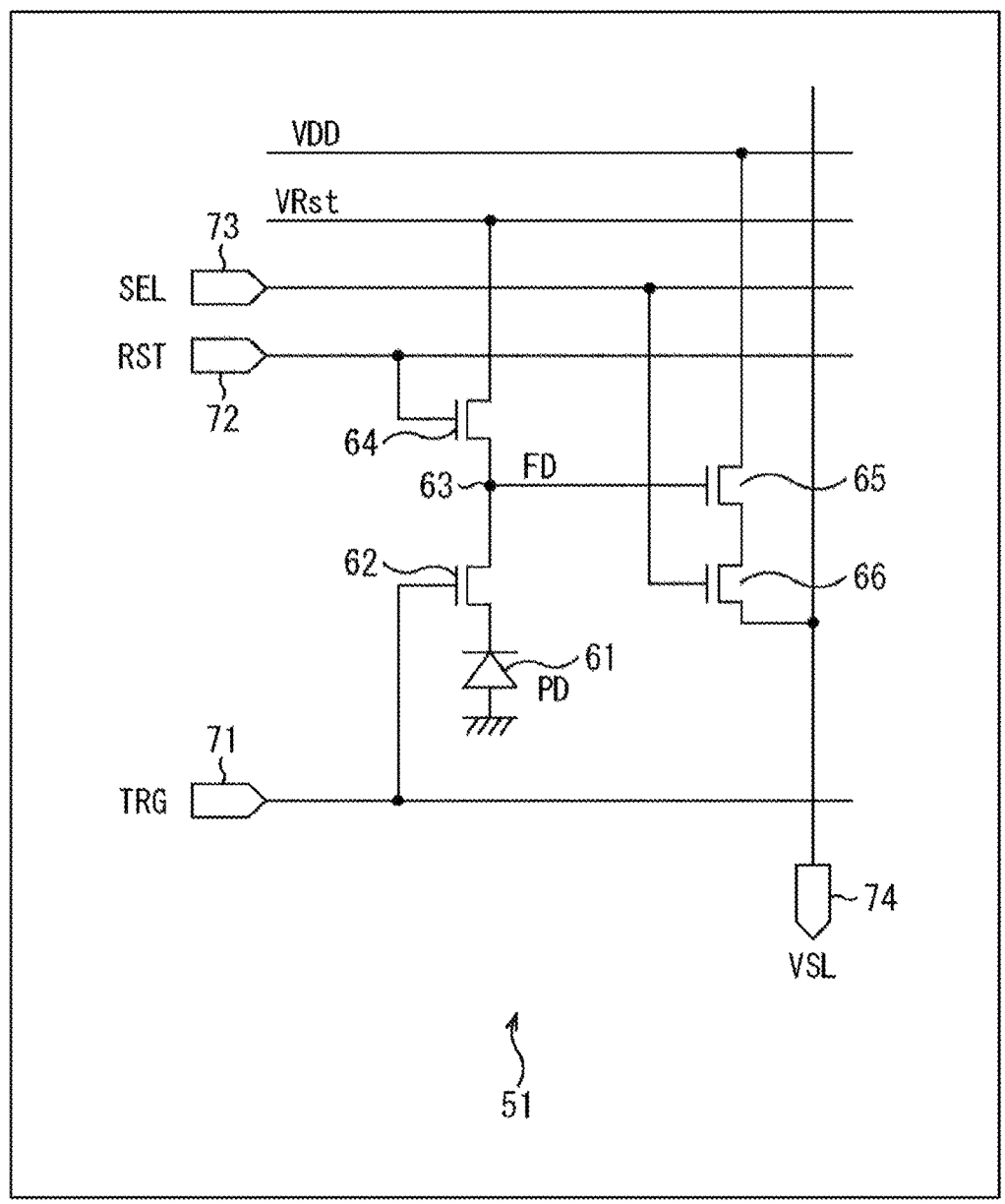
FIG. 2 is a diagram illustrating a circuit configuration example of a pixel arranged in a pixel array of FIG. 1.

FIG. 2 is a diagram illustrating a circuit configuration example of a pixel arranged in the pixel array 11 of FIG. 1.

A pixel 51 includes a photodiode 61 as a photoelectric conversion device, a transfer transistor 62, a floating diffusion (FD) 63, a reset transistor 64, an amplifying transistor 65, and a selection transistor 66. Further, the pixel 51 is connected to a terminal 71, a terminal 72, and a terminal 73, and is connected to a terminal 74.

The photodiode 61 generates and accumulates an electric charge according to a received light amount. The photodiode 61 has an anode terminal connected to a ground and a cathode terminal connected to the FD 63 through the transfer transistor 62.

A gate terminal of the transfer transistor 62 is connected to the terminal 71 to which the horizontal selection line 12 (FIG. 1) that supplies the TRG signal is connected, and the transfer transistor 62 reads electric charge generated in the photodiode 61 when turned on by the TRG signal, and transfers the electric charge to the FD 63.

The FD 63 holds the electric charge read from the photodiode 61. A gate terminal of the reset transistor 64 is connected to the terminal 72 to which the horizontal selection line 12 that supplies the RST signal is connected, and the reset transistor 64 resets a potential of the FD 63 by discharging the electric charge accumulated in the FD 63 to a constant voltage source VRst when turned on by the RST signal.

A gate terminal of the amplifying transistor 65 is connected to the FD 63, and the amplifying transistor 65 outputs the pixel signal according to the potential of the FD 63, using a power source VDD. A gate signal of the selection transistor 66 is connected to the terminal 73 to which the horizontal selection line 12 that supplies the SEL signal is connected, and the selection transistor 66 supplies the pixel signal output from the amplifying transistor 65 to the terminal 74 when turned on by the SEL signal. The terminal 74 is connected to the vertical signal line 13 of FIG. 1, and the pixel signal supplied to the terminal 74 is supplied to the CDS/ADC circuit 17 through the vertical signal line 13.

Note that the pixels 51 of the pixel array 11 share the terminal 72 and the terminal 73 in every four rows. That is, while the horizontal selection line 12 that supplies the TRG signal is provided in every row, the horizontal selection line 12 that supplies the SEL signal and the horizontal selection line 12 that supplies the RST signal are provided in every four rows.

(Configuration Example of Vertical Selection Decoder)

Figure 3:
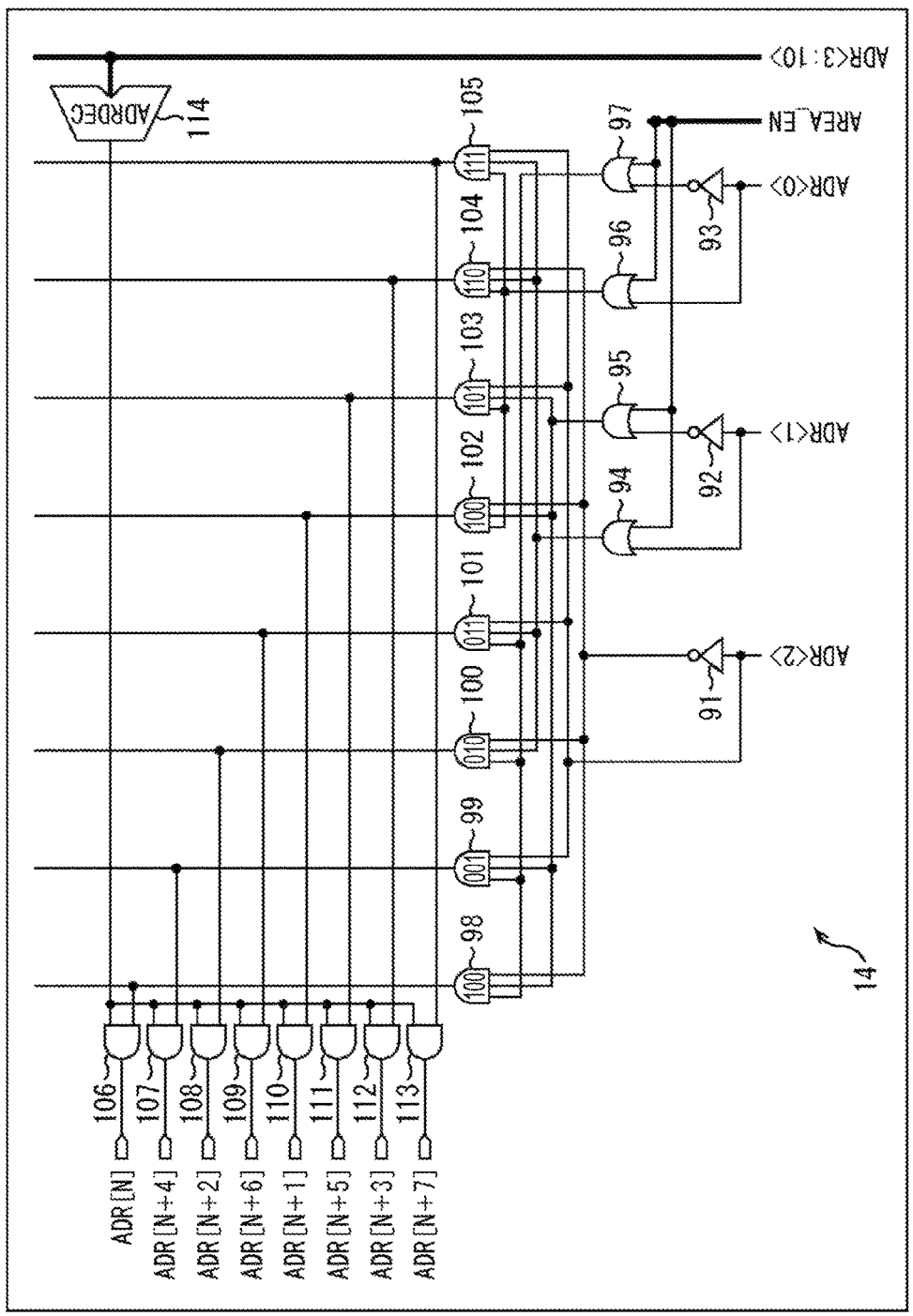
FIG. 3 is a diagram illustrating a configuration example of a vertical selection decoder of FIG. 1.

FIG. 3 is a diagram illustrating a configuration example of the vertical selection decoder 14 of FIG. 1.

Note that FIG. 3 illustrates only a portion that generates addresses of predetermined eight rows, of the vertical selection decoder 14, for convenience of description. However, a portion that generates other rows is similar.

The vertical selection decoder 14 of FIG. 3 is configured from inverters 91 to 93, OR circuits 94 to 97, AND circuits 98 to 113, and ADREC 114.

An ADR <2> signal that is a 2nd-bit signal from the bottom of a 10-bit address specified by the ADR signal is input to the AND circuits 99, 101, 103, and 105, as it is. Further, the ADR <2> signal is inverted by the inverter 91, and is input to the AND circuits 98, 100, 102, and 104.

Further, an ADR <1> signal that is a 1st-bit signal from the bottom of the address specified by the ADR signal is input to the inverter 92 and the OR circuit 94. The inverter 92 inverts the ADR <1> signal, and supplies the inverted signal to the OR circuit 95.

Further, an ADR <0> signal that is a 0th-bit signal from the bottom of the address specified by the ADR signal is input to the inverter 93 and the OR circuit 96. The inverter 93 inverts the ADR <0> signal, and supplies the inverted signal to the OR circuit 97. The AREA_EN signal is supplied to the OR circuits 94 to 97.

The OR circuits 94 to 97 respectively perform logical sum calculation of the input signals. The OR circuit 94 supplies a result of the logical sum calculation to the AND circuits 100, 101, 104, and 105, and the OR circuit 95 supplies a result of the logical sum calculation to the AND circuits 98, 99, 102, and 103. Further, the OR circuit 96 supplies a result of the logical sum calculation to the AND circuits 102 to 105, and the OR circuit 97 supplies a result of the logical sum calculation to the AND circuits 98 to 101.

The AND circuits 98 to 105 respectively perform logical product calculation of the input signals, and supply results of the logical product calculation to the AND circuits 106 to 113.

The AND circuits 106 to 113 respectively correspond to an address ADR [N], an ADR [N+4], an ADR [N+2], an ADR [N+6], an ADR [N+1], an ADR [N+5], an ADR [N+3], and an ADR [N+7]. Note that an address ADR [i] is an address that identifies an i-th row from the head. Therefore, 3rd to 10th-bit signals from the bottom of the addresses ADR [N] to ADR [N+7] are the same.

1 is input from the ADRDEC 114 to the AND circuits 106 to 113 when an ADR <3:10> signal that is a 3rd to 10th-bit signal from the bottom of the address specified by the ADR signal is the 3rd to 10th-bit signal from the bottom of the addresses ADR [N] to ADR [N+7].

The AND circuits 106 to 113 respectively perform the logical product calculation of the input signals. The AND circuits 106 to 113 respectively supply results of the logical product calculation to the latch circuit 15 of FIG. 1 as signals that indicate existence/non-existence of generation of the corresponding addresses ADR [N] to ADR [N+7]. That is, the AND circuits 106 to 113 generates the corresponding addresses ADR [N] to ADR [N+7] by generating 1 as the results of the logical product calculation, and supply the generated addresses to the latch circuit 15.

The ADR <3:10> signal is input to the ADRDEC 114. The ADRDEC 114 supplies 1 to the AND circuits 106 to 113 when the input ADR <3:10> signal is the 3rd to 10th-bit signal from the bottom of the addresses ADR [N] to ADR [N+7].

As described above, when the AREA_EN signal is 1 that indicates validity of simultaneous generation of a plurality of addresses, that is, when the ADR signal specifies the representative shutter row address, the logical sum calculation results of the OR circuits 94 to 97 become 1. Therefore, the logical product calculation results input to the AND circuits 106, 108, 110, and 112 become 1 when the ADR <2> signal is 0, and the logical product calculation results input to the AND circuits 107, 109, 111, and 113 become 1 when the ADR <2> signal is 1.

Therefore, when the ADR 212> signal is 0 and the ADR <3:10> signal is the 3rd to 10th-bit signal from the bottom of the addresses ADR [N] to ADR [N+7], the addresses ADR [N] to ADR [N+3] are generated as the shutter row addresses from the ADR signal that specifies one representative shutter row address. To be specific, 1 is output from the AND circuits 106, 108, 110, and 112 to terminals that output signals to circuits corresponding to the addresses ADR [N], ADR [N+2], ADR [N+1], and ADR [N+3] in the latch circuit 15 of FIG. 1, respectively.

Further, when the ADR <2> signal is 1, and the ADR <3:10> signal is the 3rd to 10th-bit signal from the bottom of the addresses ADR [N] to ADR [N+7], the addresses ADR [N+4] to ADR [N+7] are generated as the shutter row addresses from the ADR signal that specifies one representative shutter row address. To be specific, 1 is output from the AND circuits 107, 109, 111, and 113 to terminals that output signals to circuits corresponding to the addresses ADR [N+4], ADR [N+6], ADR [N+5], and ADR [N+7] in the latch circuit 15, respectively.

In contrast, when the AREA_EN signal is 0 that indicates invalidity of the simultaneous generation of a plurality of addresses, that is, for example, when the ADR signal specifies the reading row address, the logical sum calculation results of the OR circuits 94 to 97 become 1 only when the input ADR <0> signal or the input ADR <1> signal is 1. Therefore, the AND circuits 98 to 105 output 1 as the logical product calculation results, respectively, when the ADR <0> signal to the ADR <2> signals are "000", "100", "010", "110", "001", "101", "011", and "111".

Therefore, in this case, one reading row address is output from the ADR signal that specifies one reading row address. That is, 1 is output from any one of the AND circuits 106 to 113 when the ADR <3:10> signal is the 3rd to 10th-bit signal from the bottom of the addresses ADR [N] to ADR [N+7].

(Description of Shutter Row Addresses Generated by Vertical Selection Decoder)

Figure 4:
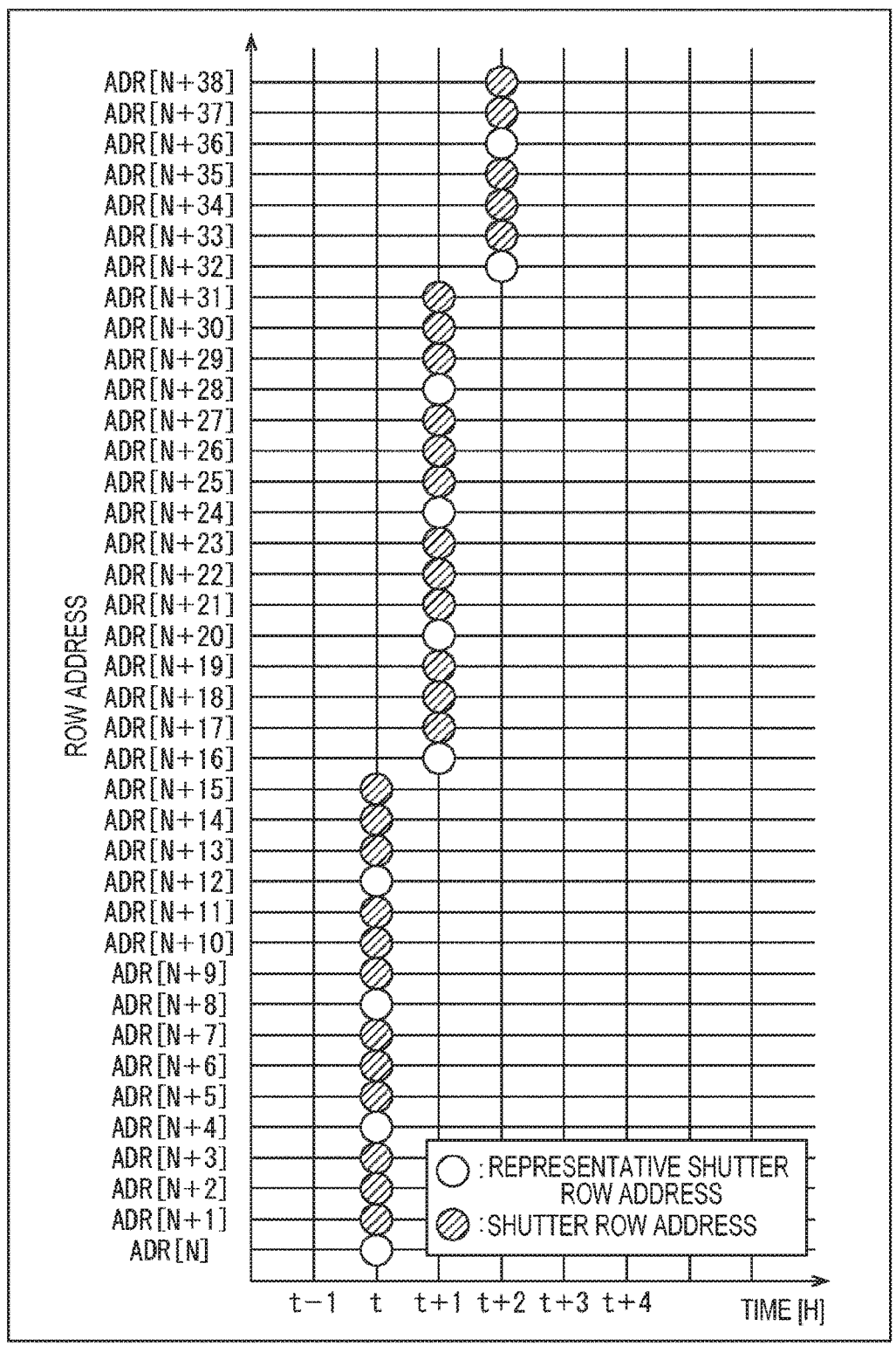
FIG. 4 is a diagram for describing shutter row addresses generated by the vertical selection decoder of FIG. 1.

FIG. 4 is a diagram for describing the shutter row addresses generated by the vertical selection decoder 14 of FIG. 1.

In FIG. 4, the horizontal axis represents a time [H] in units of a horizontal scanning period, and the vertical axis represents the addresses of the rows of the pixels 51 arranged in the pixel array 11. This similarly applies to FIGS. 9, 13, 15, 23, and 27 described below. Note that, in the present specification, the addresses of the rows are provided from 0 in order from the uppermost row, for example.

Further, in FIG. 4, the white circles represent the representative shutter row addresses, and the shaded circles represent the addresses other than the representative shutter row addresses, of the shutter row addresses generated by the vertical selection decoder 14. This similarly applies to FIG. 15 described below.

In the example of FIG. 4, the ADR signals that specify four representative shutter row addresses are generated within one horizontal scanning period. The vertical selection decoder 14 generates the shutter row addresses that identify four rows including the row identified by the representative shutter row address, and three rows continuing to the aforementioned row, with respect to the representative shutter row address specified by each of the ADR signals. Accordingly, sixteen shutter row addresses are generated within the one horizontal scanning period.

For example, in a horizontal scanning period t, the ADR signals that respectively specify the addresses ADR [N], ADR [N+4], ADR [N+8], and ADR [N+12] as the representative shutter row addresses are generated, and the vertical selection decoder 14 generates the sixteen addresses ADR [N] to ADR [N+15] as the shutter row addresses.

(Configuration Example of Latch Circuit and Vertical Drive Circuit)

Figure 5:
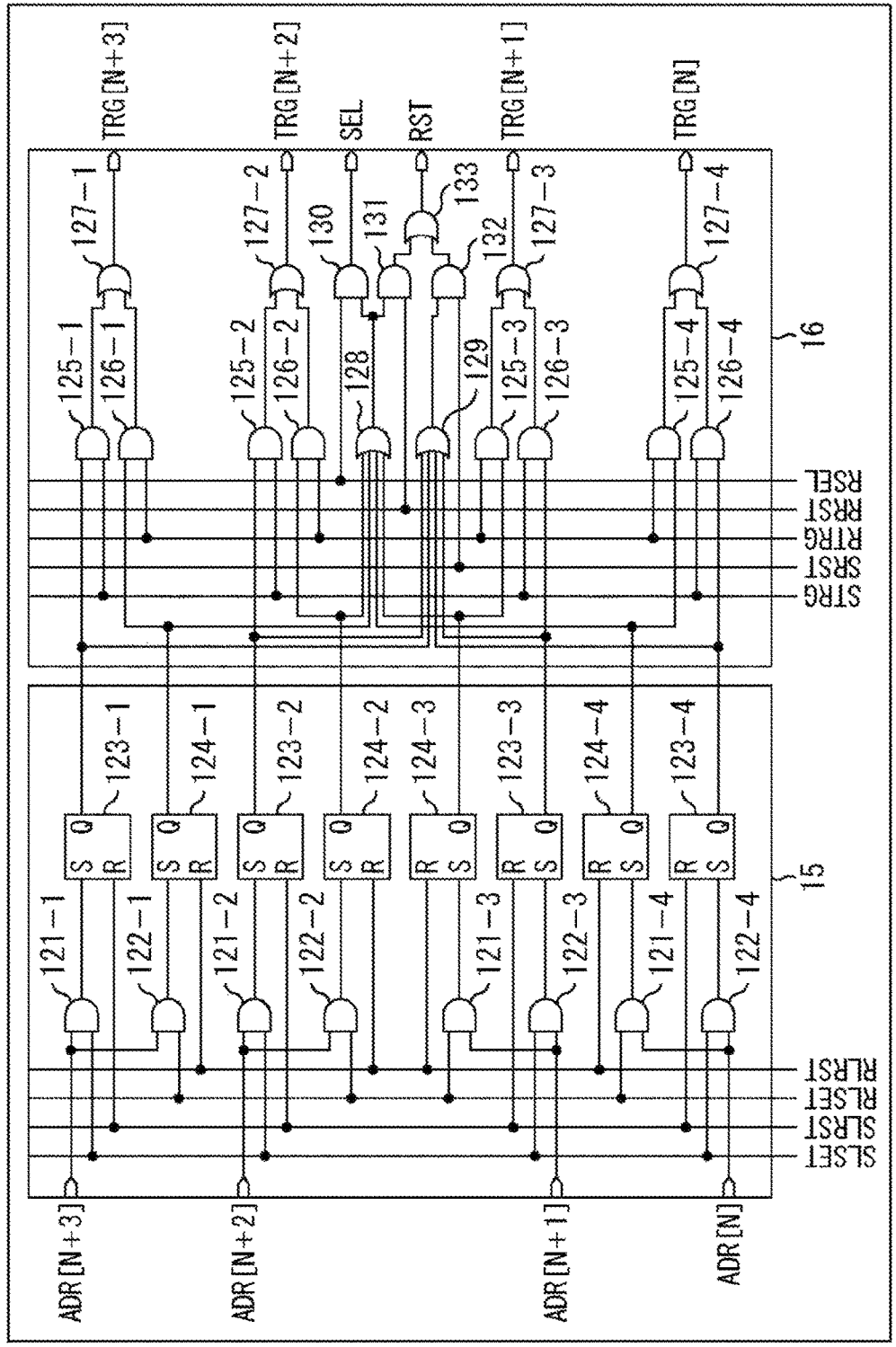
FIG. 5 is a diagram illustrating a configuration example of a latch circuit and a vertical drive circuit of FIG. 1.

FIG. 5 is a diagram illustrating a configuration example of the latch circuit 15 and the vertical drive circuit 16 of FIG. 1.

Note that FIG. 5 illustrates only a portion corresponding to the addresses ADR [N] to ADR [N+3], for convenience of description. This similarly applies to FIG. 22 described below.

The latch circuit 15 of FIG. 5 includes AND circuits 121-1 to 121-4 and 122-1 to 122-4, and S-R latch circuits 123-1 to 123-4 and 124-1 to 124-4.

The AND circuits 121-1 and 122-1, and the S-R latch circuits 123-1 and 124-1 are circuits corresponding to the row of the address ADR [N+3]. Similarly, the AND circuits 121-2 and 122-2, and the S-R latch circuits 123-2 and 124-2 are circuits corresponding to the row of the address ADR [N+2]. Further, the AND circuits 121-3 and 122-3, and the S-R latch circuits 123-3 and 124-3 are circuits corresponding to the row of the address ADR [N+1]. The AND circuits 121-4 and 122-4, and the S-R latch circuits 123-4 and 124-4 are circuits corresponding to the row of the address ADR [N].

The AND circuits 121-1 to 121-4, the AND circuits 122-1 to 122-4, the S-R latch circuits 123-1 to 123-4, and the S-R latch circuits 124-1 to 124-4 perform similar processing except that the corresponding rows are different. Therefore, hereinafter, only the processing of the AND circuits 121-1 and 122-1, and the S-R latch circuits 123-1 and 124-1 will be described.

A signal that indicates existence/non-existence of generation of the corresponding address ADR [N+3] is supplied from the AND circuit 112 (FIG. 3) of the vertical selection decoder 14 to the AND circuits 121-1 and 122-1. Further, the SLSET signal is input from the sensor controller 20 to the AND circuit 121-1, and the RLSET signal is input from the sensor controller 20 to the AND circuit 122-2. Further, the AND circuits 121-1 and 122-2 perform the logical product calculation of the input signals, and output results of the logical product calculation.

Therefore, the AND circuit 121-1 outputs 1 when the address ADR [N+3] is generated as the shutter row address or the reading row address, and the SLSET signal is 1 that indicates the address is held as the shutter row address. Meanwhile, otherwise, the AND circuit 121-1 outputs 0.

Further, the AND circuit 122-1 outputs 1 when the address ADR [N+3] is generated as the shutter row address or the reading row address, and the RLSET signal is 1 that indicates the address is held as the reading row address. Meanwhile, otherwise, the AND circuit 122-1 outputs 0.

A signal output from the AND circuit 121-1 is input to an S port of the S-R latch circuit 123-1. The S-R latch circuit 123-1 holds the signal output from the AND circuit 121-1, as a signal that indicates whether the address ADR [N+3] is the shutter row address.

That is, the S-R latch circuit 123-1 holds the address ADR [N+3] as the shutter row address by holding 1 that is the signal output from the AND circuit 121-1, as the signal that indicates the address ADR [N+3] is the shutter row address. Further, the S-R latch circuit 123-1 holds 0 that is the signal output from the AND circuit 121-1, as the signal that indicates the address ADR [N+3] is not the shutter row address.

The S-R latch circuit 123-1 outputs the held signal through a Q port to the vertical drive circuit 16. The S-R latch circuit 123-1 sets the corresponding address ADR [N+3] to the shutter row address by outputting the held 1 to the vertical drive circuit 16.

Further, the SLRST signal is input from the sensor controller 20 to an R port of the S-R latch circuit 123-1. The S-R latch circuit 123-1 makes the held signal clear (set the signal to 0) when the SLRST signal is 1 that indicates cancellation of the shutter row address held in the latch circuit 15.

A signal output from the AND circuit 122-1 is input to an S port of the S-R latch circuit 124-1. The S-R latch circuit 124-1 holds the signal output from the AND circuit 122-1, as a signal that indicates whether the address ADR [N+3] is the reading row address.

That is, the S-R latch circuit 124-1 holds the address ADR [N+3] as the reading row address by holding 1 that is the signal output from the AND circuit 122-1, as the signal that indicates the address ADR [N+3] is the reading row address. Further, the S-R latch circuit 124-1 holds 0 that is the signal output from the AND circuit 122-1, as the signal that indicates the address ADR [N+3] is not the reading row address.

The S-R latch circuit 124-1 outputs the held signal through a Q port to the vertical drive circuit 16. The S-R latch circuit 124-1 sets the corresponding address ADR [N+3] to the reading row address by outputting the held 1 to the vertical drive circuit 16.

Further, the RLRST signal is input from the sensor controller 20 to an R port of the S-R latch circuit 124-1. The S-R latch circuit 124-1 makes the held signal clear when the RLRST signal is 1 that indicates cancellation of the reading row address held in the latch circuit 15.

The vertical drive circuit 16 includes AND circuits 125-1 to 125-4 and 126-1 to 126-4, OR circuits 127-1 to 127-4, 128, and 129, AND circuits 130 to 132, and an OR circuit 133.

The AND circuits 125-1 and 126-1, and the OR circuit 127-1 are circuits corresponding to the address ADR [N+3]. Similarly, the AND circuits 125-2 and 126-2, and the OR circuit 127-2 are circuits corresponding to the address ADR [N+2]. The AND circuits 125-3 and 126-3, and the OR circuit 127-3 are circuits corresponding to the address ADR [N+1]. The AND circuits 125-4 and 126-4, and the OR circuit 127-4 are circuits corresponding to the address ADR [N].

The AND circuits 125-1 to 125-4, the AND circuits 126-1 to 126-4, and the OR circuits 127-1 to 127-4 perform similar processing except that the corresponding rows are different. Therefore, hereinafter, only the processing of the AND circuits 125-1 and 126-1, and the OR circuit 127-1 will be described.

The AND circuit 125-1 performs the logical product calculation of the signal supplied from the S-R latch circuit 123-1 and the STRG signal supplies from the sensor controller 20, and outputs a result of the logical product calculation to the OR circuit 127-1. Further, the AND circuit 126-1 performs the logical product calculation of the signal supplied from the S-R latch circuit 124-1 and the RTRG signal supplied from the sensor controller 20, and outputs a result of the logical product calculation to the OR circuit 127-1.

Further, the OR circuit 127-1 performs the logical sum calculation of the calculation result output from the AND circuit 125-1 and the calculation result output from the AND circuit 126-1. The OR circuit 127-1 outputs a result of the logical sum calculation to the horizontal selection line 12 connected to the pixels of the row, as a TRG [N+3] signal that is the TRG signal of the pixels of the row of the address ADR [N+3].

As described above, when the STRG signal is 1 that indicates the TRG signal is controlled to 1 for the electronic shutter operation, and the address ADR [N+3] is the shutter row address, 1 is output to the horizontal selection line 12 connected to the pixels of the row of the address ADR [N+3], as the TRG [N+3] signal. Further, when the RTRG signal is 1 that indicates the TRG signal is controlled to 1 for the reading operation, and the address ADR [N+3] is the reading row address, 1 is output to the horizontal selection line 12 connected to the pixels of the row of the address ADR [N+3], as the TRG [N+3] signal.

Further, the OR circuits 128, 129, and 133, and the AND circuits 130 to 132 are circuits corresponding to the four rows of the addresses ADR [N] to ADR [N+3].

Signals output from the S-R latch circuits 124-1 to 124-4 are input to the OR circuit 128. The OR circuit 128 performs the logical sum calculation of the input signals, and supplies a result of the logical sum calculation to the AND circuits 130 and 131. Accordingly, when at least one of the addresses ADR [N] to ADR [N+3] is the reading row address, 1 is supplied from the OR circuit 128 to the AND circuits 130 and 131, and when all of the addresses ADR [N] to ADR [N+3] are not the reading row addresses, 0 is supplied.

Signals output from the S-R latch circuits 123-1 to 123-4 are input to the OR circuit 129. The OR circuit 128 performs the logical sum calculation of the input signals, and supplies a result of the logical sum calculation to the AND circuit 132. Accordingly, 1 is supplied from the OR circuit 128 to the AND circuit 132 when at least one of the addresses ADR [N] to ADR [N+3] is the shutter row address, and 0 is supplied when all of the addresses ADR [N] to ADR [N+3] are not the shutter row addresses.

The AND circuit 130 performs the logical product calculation of the signal supplied from the OR circuit 128 and the RSEL signal supplied from the sensor controller 20. The AND circuit 130 outputs a result of the logical product calculation to the horizontal selection line 12 connected to the pixels of the four rows, as the SEL signal of the pixels of the four rows of the addresses ADR [N] to ADR [N+3]. Accordingly, when the RSEL signal is 1 that indicates the SEL signal is controlled to 1 for the reading operation, and at least one of the addresses ADR [N] to ADR [N+3] is the reading row address, 1 is output to the horizontal selection line 12 connected to the pixels of the rows of the addresses ADR [N] to ADR [N+3], as the SEL signal.

The AND circuit 131 performs the logical product calculation of the signal supplied from the OR circuit 128 and the RRST signal supplied from the sensor controller 20, and supplies a result of the logical product calculation to the OR circuit 133. Further, the AND circuit 132 performs the logical product calculation of the signal supplied from the OR circuit 129 and the SRST signal supplied from the sensor controller 20, and supplies a result of the logical product calculation to the OR circuit 133.

The OR circuit 133 performs the logical sum calculation of the signal supplied from the AND circuit 131 and the signal supplied from the AND circuit 132. The OR circuit 133 outputs a result of the logical sum calculation to the horizontal selection line 12 connected to the pixels of the four rows, as the RST signal of the pixels of the four rows of the addresses ADR [N] to ADR [N+3].

Accordingly, when the RRST signal is 1 that indicates the RST signal is controlled to 1 for the reading operation, and at least one of the addresses ADR [N] to ADR [N+3] is the reading row address, 1 as the RST signal is output to the horizontal selection line 12 connected to the pixels of the rows of the addresses ADR [N] to ADR [N+3]. Further, when the SRST signal is 1 that indicates the RST signal is controlled to 1 for the electronic shutter operation, and at least one of the addresses ADR [N] to ADR [N+3] is the shutter row address, 1 as the RST signal is output to the horizontal selection line 12 connected to the pixels of the rows of the addresses ADR [N] to ADR [N+3].

Note that, hereinafter, when it is not necessary to distinguish the AND circuits corresponding to the AND circuit 121-1, of the rows, the AND circuits are collectively referred to as AND circuit 121. Similarly, the other AND circuits, latch circuits, and OR circuits are referred to as AND circuit 122, S-R latch circuit 123, S-R latch circuit 124, AND circuit 125, AND circuit 126, and OR circuit 127. Further, when it is not necessary to distinguish the OR circuits corresponding to the OR circuit 128 in every four rows, the OR circuits are collectively referred to as OR circuit 128A. Similarly, the other OR circuits and AND circuits are referred to as OR circuit 129A, AND circuit 130A, AND circuit 131A, AND circuit 132A, and OR circuit 133A.

(Example of Timing of Various Signals)

Figure 6:
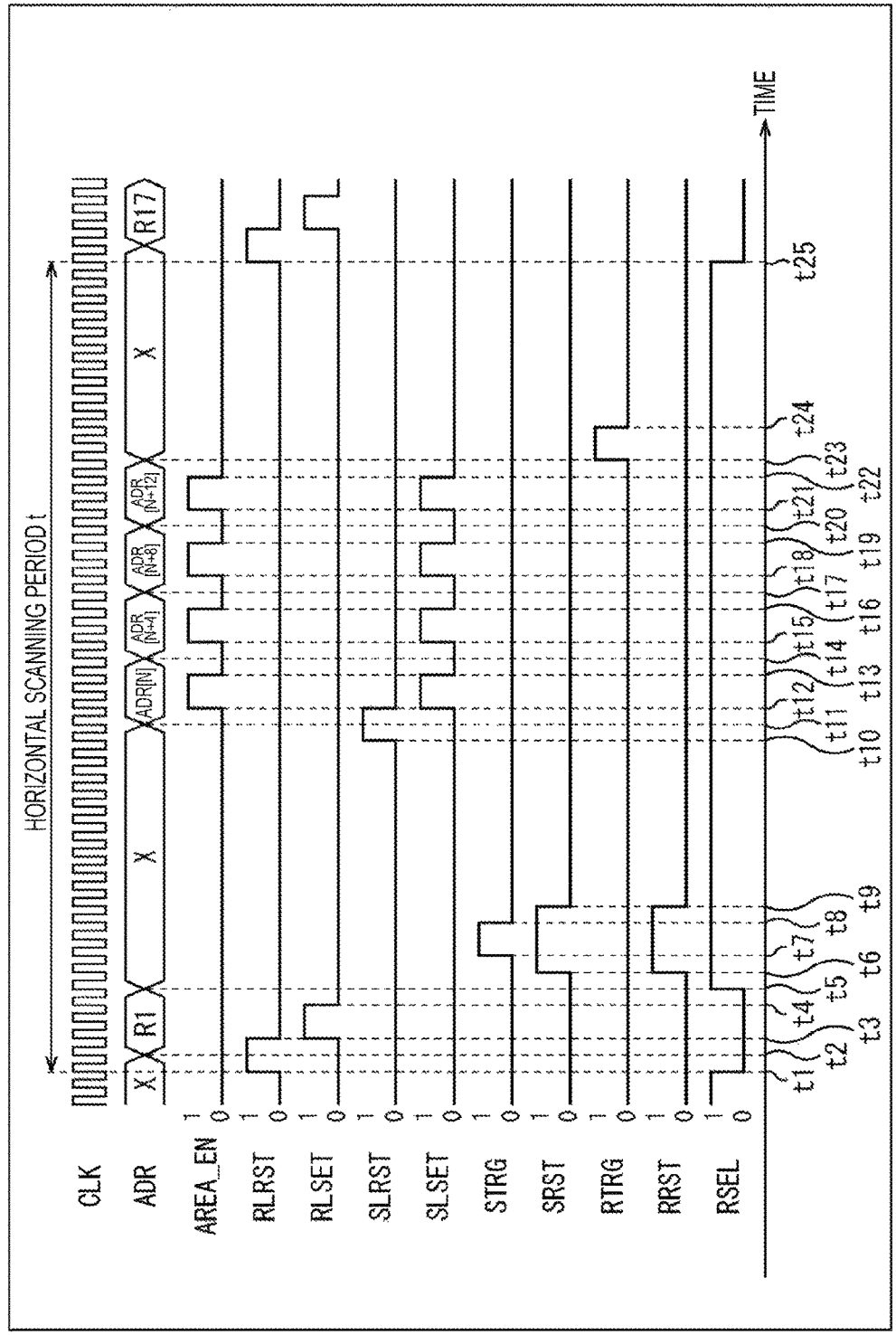
FIG. 6 is a timing chart illustrating an example of timing of various signals generated by a sensor controller of FIG. 1.

FIG. 6 is a timing chart illustrating an example of timing of various signals generated by the sensor controller 20 of FIG. 1.

In FIG. 6, the horizontal axis represents a time. This similarly applies to FIGS. 11, 14, 16, 25, and 28 described below. Further, FIG. 6 illustrates timing of various signals in the horizontal scanning period t of FIG. 4.

As illustrated in FIG. 6, the sensor controller 20 generates various signals according to a CLK signal that is a clock signal input from a clock generator (not illustrated).

To be specific, at a time t1 in the horizontal scanning period t, the sensor controller 20 causes the RLRST signal to transition from 0 to 1. Accordingly, all of the S-R latch circuits 123 are reset. Further, at a time t1, the sensor controller 20 causes the RSEL signal to transition from 1 to 0.

At a time t2, the sensor controller 20 generates, as the ADR signal, a signal that specifies the address of a predetermined row of the pixels 51 arranged in the pixel array 11 as a reading row address R1. At a time t3, the sensor controller 20 causes the RLRST signal to transition from 1 to 0, and causes the RLSET signal to transition from 0 to 1.

Accordingly, 1 is output and held in only the S-R latch circuit 123 of the reading row address R1, of all of the S-R latch circuits 123.

At a time t4, the sensor controller 20 causes the RLSET signal to transition from 1 to 0. At a time t5, the sensor controller 20 causes the RSEL signal to transition from 0 to 1. Accordingly, the SEL signal to be supplied to the pixels 51 of the four rows including the row of the reading row address R1 becomes 1. As a result the selection transistors 66 of the pixels 51 of the four rows are turned on, and supply of the pixel signals according to the potentials of the FDs 63 to the CDS/ADC circuits 17 is started.

At a time t6, the sensor controller 20 causes the SRST signal and the RRST signal to transition from 0 to 1. Accordingly, the RST signal to be supplied to the pixels 51 of the four rows including the row of the reading row address R1, and the pixels 51 of the four rows including the row of the shutter row address in the previous horizontal scanning period t−1 becomes 1. As a result, the reset transistors 64 of the pixels 51 are turned on, and discharge of the potentials of the FDs 63 to the constant voltage sources VRst is started.

At a time t7, the sensor controller 20 causes the STRG signal to transition from 0 to 1. Accordingly, the TRG signal to be supplied to the pixel 51 of the row of the shutter row address in the horizontal scanning period t−1 becomes 1. As a result, the transfer transistor 62 of the pixel 51 is turned on, and the electric charge accumulated in the photodiode 61 is discharged to the constant voltage source VRst through the FD 63. That is, the electronic shutter operation of the pixel 51 of the shutter row address in the horizontal scanning period t−1 is performed.

At a time t8, the sensor controller 20 causes the STRG signal to transition from 1 to 0, and at a time t9, the sensor controller 20 causes the SRST signal and the RRST signal to transition from 1 to 0. Accordingly, the electronic shutter operation of the pixels 51 of the shutter row address in the horizontal scanning period t−1, and discharge (reset) of the potentials of the FDs 63 of the pixels 51 of the four rows including the row of the reading row address R1, and the four rows including the row of the shutter row address in the horizontal scanning period t−1 are terminated.

At a time t10, the sensor controller 20 causes the SLRST signal to transition from 0 to 1. Accordingly, all of the S-R latch circuits 123 are reset. At a time t11, the sensor controller 20 generates, as the ADR signal, a signal that specifies the address ADR [N] as the representative shutter row address.

At a time t12, the sensor controller 20 causes the AREA_EN signal to transition from 0 to 1. Accordingly, the vertical selection decoder 14 generates the address ADR [N], and the addresses ADR [N+1] to ADR [N+3] of three rows continuing to the row of the address ADR [N], as the shutter row addresses.

Further, at a time t12, the sensor controller 20 causes the SLRST signal to transition from 1 to 0, and causes the SLSET signal to transition from 0 to 1. Accordingly, 1 is output and held in only the S-R latch circuits 123 of the addresses ADR [N] to ADR [N+3], of all of the S-R latch circuits 123. At a time t13, the sensor controller 20 causes the AREA_EN signal and the SLSET signal to transition from 1 to 0.

At a time t14, the sensor controller 20 generates, as the ADR signal, a signal that specifies the address ADR [N+4] as the representative shutter row address. At a time t15, the sensor controller 20 causes the AREA_EN signal to transition from 0 to 1. Accordingly, the vertical selection decoder 14 generates the address ADR [N+4], and the addresses ADR [N+5] to ADR [N+7] of three rows continuing to the row of the address ADR [N+4], as the shutter row addresses.

At a time t15, the sensor controller 20 causes the SLSET signal to transition from 0 to 1. Accordingly, 1 is output and held in only the S-R latch circuits 123 of the addresses ADR [N+4] to ADR [N+7], of all of the S-R latch circuits 123. At a time t16, the sensor controller 20 causes the AREA_EN signal and the SLSET signal to transition from 1 to 0.

Processing at times t17 to t19 is similar to the processing at the times t14 to t16 except that the ADR signal is a signal that specifies the address ADR [N+8] as the representative shutter row address. By the processing at the times t17 to t19, 1 is output and held in the S-R latch circuits 123 of the addresses ADR [N+8] to ADR [N+11].

Further, processing at times t20 to t22 is similar to the processing at the times t14 to t16 except that the ADR signal is a signal that specifies the address ADR [N+12] as the representative shutter row address. By the processing at the times t20 to t22, 1 is output and held in the S-R latch circuits 123 of the addresses ADR [N+12] to ADR [N+15]. As described above, in the pixels 51 of the rows of the addresses ADR [N] to ADR [N+15] corresponding to the S-R latch circuits 123 to which 1 is output, the electronic shutter operation is performed in the next horizontal scanning period t+1.

At a time t23, the sensor controller 20 causes the RTRG signal to transition from 0 to 1. Accordingly, the TRG signal to be supplied to the pixel 51 of the reading row address R1 becomes 1. As a result, the transfer transistor 62 of the pixel 51 is turned on, and transfer of the electric charge accumulated in the photodiode 61 to the FD 63 is started. At this time, the selection transistor 66 of the pixel 51 of the reading row address R1 is on, and thus the pixel signal according to the potential of the FD 63 is supplied to the CDS/ADC circuit 17. That is, the reading operation is started.

At a time t24, the sensor controller 20 causes the RTRG signal to transition from 1 to 0. Accordingly, the transfer of the electric charge accumulated in the photodiode 61 of the pixel 51 of the reading row address R1 to the FD 63 is terminated, and the reading operation is terminated.

At a time t25, the sensor controller 20 causes the RSEL signal to transition from 1 to 0. Then, the next horizontal scanning period t+1 is started.

As described above, the sensor controller 20 sets the shutter row addresses and the reading row addresses during one horizontal scanning period by the time-division multiplex method.

Further, the vertical selection decoder 14 of the CMOS image sensor 10 generates four shutter row addresses from one representative shutter row address. Therefore, setting the shutter row addresses requires less time (the time from the time t10 to the time t23 in the example of FIG. 6 can be short). As a result, a high-quality pixel signal can be output at a high frame rate.

That is, the circuits for setting the addresses such as the shutter row address and the reading row address are digital signal processing circuits that may generate power source noises and the like and decrease the quality of the electrical signal, such as the vertical selection decoder 14, the latch circuit 15, the vertical drive circuit 16, and the sensor controller 20. Therefore, if setting of the addresses is performed at the same time with the operation to read the pixel signal from the pixel 51 that is an analog signal calculation circuit that requires highly accurate signal processing, the image quality may be decreased. Therefore, by not performing specification of the addresses and the reading operation at the same time, the high-quality pixel signal can be output. However, the frame rate is decreased.

Meanwhile, in the CMOS image sensor 10, setting the shutter row addresses requires less time. Therefore, even in a case where the specification of the addresses and the reading operation are not performed at the same time, the frame rate can be improved. As a result, the high-quality pixel signal can be output at a high frame rate.

As described above, the CMOS image sensor 10 can output the high-quality pixel signal at a high frame rate. Considering further demands of an increase in the number of pixels and a higher frame rate in the future, setting a larger number of shutter row addresses at the same time and shortening the time to set the shutter row addresses are desirable.

Therefore, in the present disclosure, a larger number of shutter row addresses is set at the same time by specifying the range of the shutter row addresses.

First Embodiment (Configuration Example of First Embodiment of CMOS Image Sensor)

Figure 7:
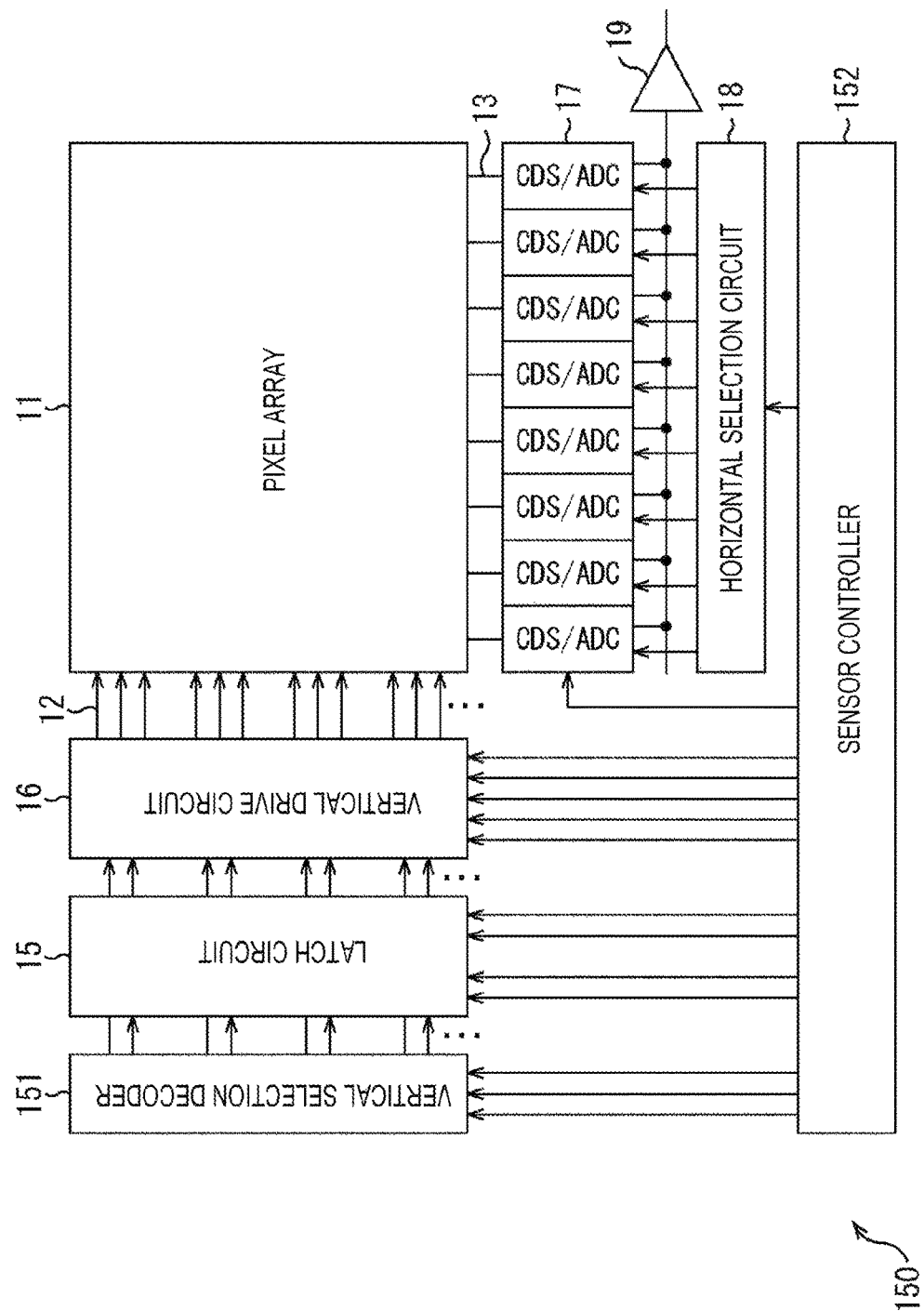
FIG. 7 is a diagram illustrating a configuration example of a first embodiment of a CMOS image sensor to which the present disclosure is applied.

FIG. 7 is a diagram illustrating a configuration example of a first embodiment of a CMOS image sensor to which the present disclosure is applied.

The same configuration as the configuration of FIG. 1, of configurations illustrated in FIG. 7, is denoted with the same reference sign. Overlapping description is appropriately omitted.

The configuration of a CMOS image sensor 150 of FIG. 7 is different from the configuration of the CMOS image sensor 10 of FIG. 1 in that the vertical selection decoder 14 is in place of a vertical selection decoder 151 and the sensor controller 20 is in place of a sensor controller 152. That is, the CMOS image sensor 150 is configured from a pixel array 11, a horizontal selection line 12, a vertical signal line 13, and a control device made of the vertical selection decoder 151, a latch circuit 15, a vertical drive circuit 16, a CDS/ADC circuit 17, a horizontal selection circuit 18, an amplifier circuit 19, and the sensor controller 152.

The CMOS image sensor 150 sets a reading row address on the basis of a start address and an end address of the reading row address, and sets shutter row addresses on the basis of a start address and an end address of the shutter row addresses.

To be specific, an ST_ADR signal that indicates the start address of successive shutter row addresses or the reading row address is supplied from the sensor controller 152 to the vertical selection decoder 151 of the CMOS image sensor 150. Further, an ED_ADR signal that indicates the end address of the successive shutter row addresses or the reading row address is supplied from the sensor controller 152 to the vertical selection decoder 151. Further, an AREA_EN signal is supplied from the sensor controller 152 to the vertical selection decoder 151. The vertical selection decoder 151 generates the shutter row addresses and the reading row address on the basis of the ST_ADR signal, the ED_ADR signal, and the AREA_EN signal, and supplies the generated addresses to the latch circuit 15.

The latch circuit 15 sets the reading row address generated by the vertical selection decoder 151 on the basis of an RLRST signal and an RLSET signal supplied from the sensor controller 152. Further, the latch circuit 15 sets the shutter row addresses generated by the vertical selection decoder 151 on the basis of an SLRST signal and an SLSET signal supplied from the sensor controller 152.

As described above, the vertical selection decoder 151 and the latch circuit 15 function as an address setting unit, and sets the shutter row addresses and the reading row address on the basis of the ST_ADR signal, the ED_ADR signal, and the AREA_EN signal.

The sensor controller 152 controls imaging by the CMOS image sensor 150 by generating various signals. To be specific, the sensor controller 152 generates the ST_ADR signal, the ED_ADR signal, and the AREA_EN signal, and supplies the generated signals to the vertical selection decoder 151. Further, the sensor controller 152 generates the RLSET signal, the RLSET signal, the SLRST signal, and the SLSET signal, and supplies the generated signals to the latch circuit 15. Further, the sensor controller 152 generates an STRG signal, an SRST signal, an RTRG signal, an RRST signal, and an RSEL signal, and supplies the generated signals to the vertical drive circuit 16.

(Configuration Example of Vertical Selection Decoder)

Figure 8:
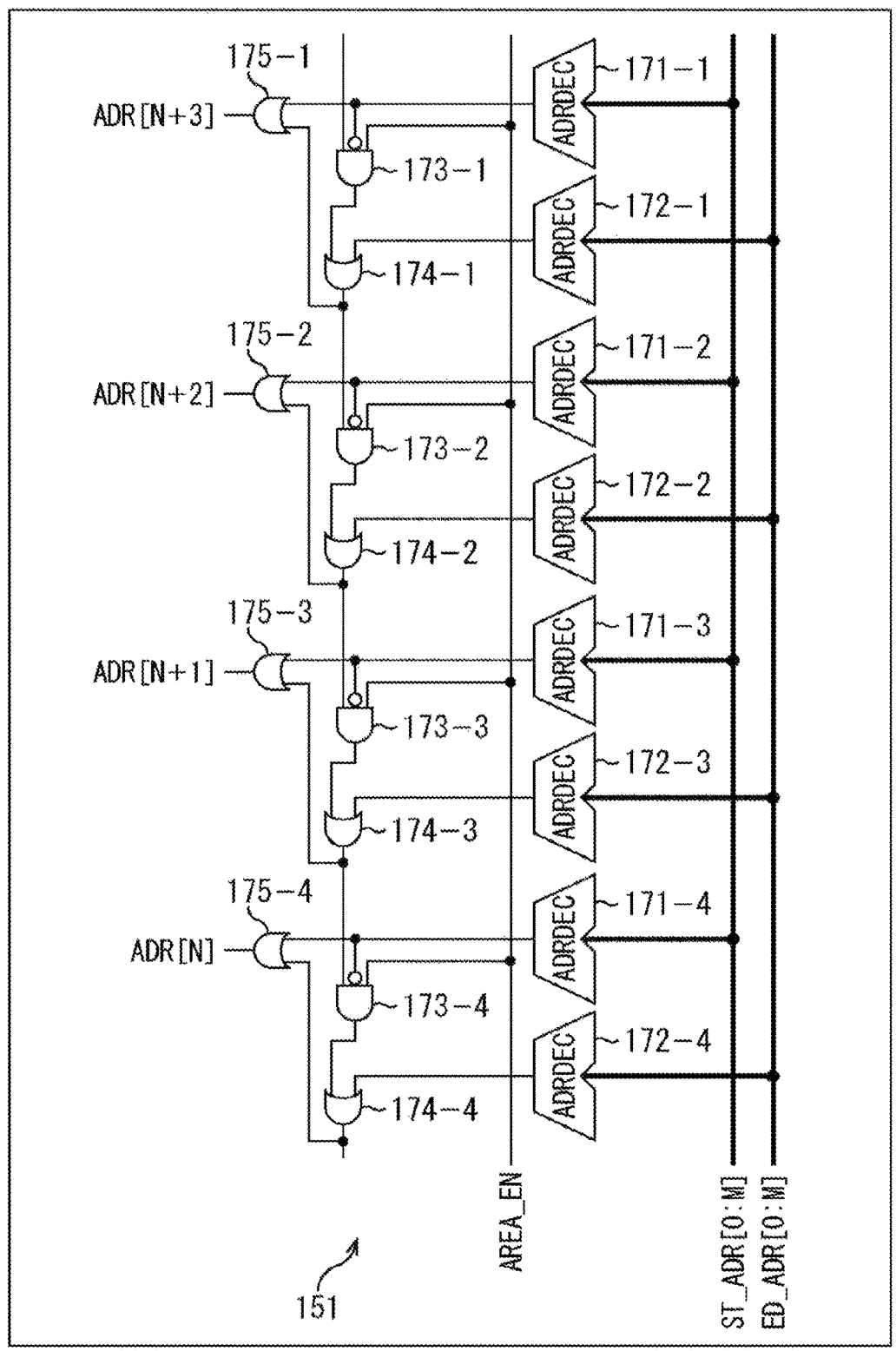
FIG. 8 is a diagram illustrating a configuration example of a vertical selection decoder of FIG. 7.

FIG. 8 is a diagram illustrating a configuration example of the vertical selection decoder 151 of FIG. 7.

Note that FIG. 8 illustrates only a portion corresponding to addresses ADR [N] to ADR [N+3] for convenience of description. However, a portion of other addresses is also similar. This similarly applies to FIG. 18 described below.

The vertical selection decoder 151 of FIG. 8 includes ADRDECs 171-1 to 171-4 and 172-1 to 172-4, AND circuits 173-1 to 173-4, and OR circuits 174-1 to 174-4 and 175-1 to 175-4.

The ADRDECs 171-1 and 172-1, the AND circuit 173-1, and the OR circuits 174-1 and 175-1 generate the address ADR [N+3] as the shutter row address or the reading row address. Similarly, the ADRDECs 171-2 and 172-2, the AND circuit 173-2, and the OR circuits 174-2 and 175-2 generate the address ADR [N+2] as the shutter row address or the reading row address.

The ADRDECs 171-3 and 172-3, the AND circuit 173-3, and the OR circuits 174-3 and 175-3 generate the address ADR [N+1] as the shutter row address or the reading row address. The ADRDECs 171-4 and 172-4, the AND circuit 173-4, and the OR circuits 174-4 and 175-4 generate an address ADR [N+4] as the shutter row address or the reading row address.

The ADRDECs 171-1 to 171-4, the ADRDECs 172-1 to 172-4, the AND circuits 173-1 to 173-4, the OR circuits 174-1 to 174-4, and the OR circuits 175-1 to 175-4 perform similar processing except that the corresponding rows are different. Therefore, hereinafter, only the ADRDECs 171-2 and 172-2, the AND circuit 173-2, and the OR circuits 174-2 and 175-2 will be described.

An M-bit ST_ADR signal is input from the sensor controller 152 of FIG. 7 to the ADRDEC 171-2. The ADRDEC 171-2 outputs 1 when the input ST_ADR signal is a signal that specifies the address ADR [N+2] as the start address, and outputs 0 when the input ST_ADR signal is not the signal that specifies the address ADR [N+2] as the start address.

An M-bit ED_ADR signal is input from the sensor controller 152 to the ADRDEC 172-2. The ADRDEC 172-2 outputs 1 when the input ED_ADR signal is a signal that specifies the address ADR [N+2] as the end address, and outputs 0 when the input ED_ADR signal is not the signal that specifies the address ADR [N+2] as the end address.

A signal output from the OR circuit 174-1 of one subsequent row, an inverted signal of the signal output from the ADRDEC 171-2, and the AREA_EN signal supplied from the sensor controller 152 are input to the AND circuit 173-2. The AND circuit 173-2 performs logical product calculation of the input signals, and supplies a result of the logical product calculation to the OR circuit 174-1.

The OR circuit 174-2 performs logical sum calculation of the signal supplied from the AND circuit 173-2 and the signal output from the ADRDEC 172-2, and supplies a result of the logical sum calculation to the AND circuit 173-3 of one previous row and the OR circuit 175-2 of the own row.

The OR circuit 175-2 performs the logical sum calculation of the signal output from the ADRDEC 171-2 and the signal supplied from the OR circuit 174-2. The OR circuit 175-2 supplies a result of the logical sum calculation to the latch circuit 15 of FIG. 7, as a signal that indicates existence/non-existence of the corresponding address ADR [N+2]. That is, the OR circuit 175-2 generates the corresponding address ADR [N+2] by generating 1 as the calculation result of the logical sum, and supplies the generated address to the latch circuit 15.

Note that, hereinafter, when it is not especially necessary to distinguish the ADRDECs corresponding to the ADRDEC 171-1, of rows, the ADRDECs are collectively referred to as ADRDEC 171. Similarly, the other ADRDECs, the AND circuits, and the OR circuits are collectively referred to as ADRDEC 172, AND circuit 173, OR circuit 174, and OR circuit 175.

With the configuration illustrated in FIG. 8, for example, when the start address of the shutter row addresses indicated by the ST_ADR signal is the address ADR [N+1], and the end address of the shutter row addresses indicated by the ED_ADR signal is the address ADR [N+3], the vertical selection decoder 151 is operated as follows.

That is, in this case, an output of the ADRDEC 172-1 corresponding to the address ADR [N+3] as the end address becomes 1, and accordingly, an output of the OR circuit 174-1 becomes 1. Therefore, the OR circuit 175-1 generates 1, as a result of the logical sum calculation.

Further, the AREA_EN signal is 1, outputs of the AND circuits 173 of rows of addresses in advance of the address ADR [N+3] are 1 up to the AND circuit 173 in which the signal input from the ADRDEC 171 becomes 0. That is, an output of the AND circuit 173-2 from the row of the one previous address ADR [N+2] of the end address to the row of the one subsequent address ADR [N+2] of the start address becomes 1. Therefore, the OR circuit 175-2 generates 1, as a result of the logical sum calculation.

Since 1 is input from the ADRDEC 171-3 to the OR circuit 175-3 of the row of the address ADR [N+1] as the start address, the OR circuit 175-3 generates 1, as a result of the logical sum calculation.

Meanwhile, the signal input from the ADRDEC 171-3 to the AND circuit 173-3 is 0, and the signal input from the AND circuit 173-3 to the OR circuit 174-3 is 0. Further, the signal input from the ADRDEC 172-3 to the OR circuit 174-3 is also 0. Therefore, an output from the OR circuit 174-3 becomes 0. Further, outputs from the ADRDECs 171 and 172 of addresses in advance of the address ADR [N+1] are 0. Therefore, the OR circuits 175 corresponding to the addresses in advance of the address ADR [N+1] generate 0, as a result of the logical sum calculation.

Further, the AREA_EN signal and signals other than the signal from the ADRDEC 171, which are input to the AND circuit 173 of the last row (not illustrated), are 0. Further, 0 is input to the ADRDECs 171 and 172 from the last row to the row of the address ADR [N+4]. Therefore, the OR circuits 175 from the last row to the row of the address ADR [N+4] next to the end address generate 0, as a result of the logical sum calculation.

As described above, the addresses from the start address indicated by the ST_ADR signal to the end address indicated by the ED_ADR signal are generated as the shutter row addresses.

In contrast, when the ST_ADR signal and the ED_ADR signal indicate the start address and the end address of the reading row address, respectively, the AREA_EN signal becomes 0. Therefore, only the OR circuit 175 with an output of the ADRDEC 171 or the ADRDEC 172 being 1 generates 1, as a result of the logical sum calculation. That is, only the address indicated by the ST_ADR signal and the address indicated by the ED_ADR signal are generated as the reading row addresses.

(Description of Shutter Row Addresses Generated by Vertical Selection Decoder)

Figure 9:
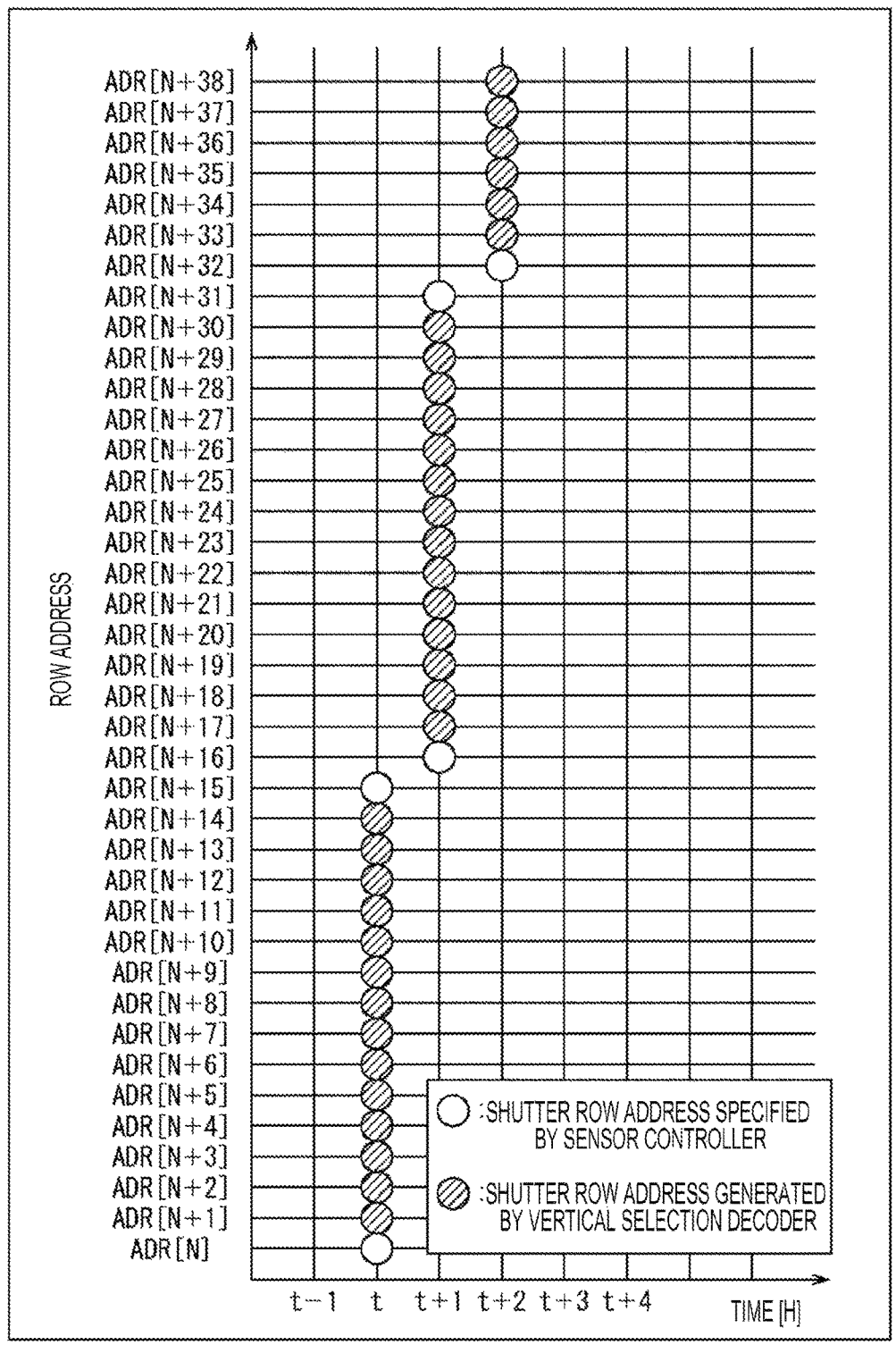
FIG. 9 is a diagram for describing an example of shutter row addresses generated by the vertical selection decoder.

FIG. 9 is a diagram for describing the shutter row addresses generated by the vertical selection decoder 151.

In FIG. 9, the white circles represent the shutter row addresses specified by the sensor controller 152, and the shaded circles represent the shutter row addresses not specified by the sensor controller 152, of the shutter row addresses generated by the vertical selection decoder 151. This similarly applies to FIG. 13 described below.

In the example of FIG. 9, a difference between the start address and the end address of the shutter row addresses in one horizontal scanning period is fifteen. The vertical selection decoder 151 generates sixteen addresses in the range from the start address to the end address, as the shutter row addresses.

To be specific, for example, in a horizontal scanning period t, the sensor controller 152 generates the ST_ADR signal that specifies the address ADR [N] as the start address of the shutter row addresses, and the ED_ADR signal that specifies an address ADR [N+12] as the end address of the shutter row addresses. Then, the vertical selection decoder 14 generates sixteen addresses ADR [N] to ADR [N+15], as the shutter row addresses, on the basis of the ST_ADR signal and the ED_ADR signal.

As illustrated in FIG. 4, the ADR signal that specifies four representative shutter row addresses needs to be input to the vertical selection decoder 14 in order to generate sixteen shutter row addresses. However, as illustrated in FIG. 9, only an input of the ST_ADR signal and the ED_ADR signal, which specify two addresses, to the vertical selection decoder 151 is required.

Figure 10:
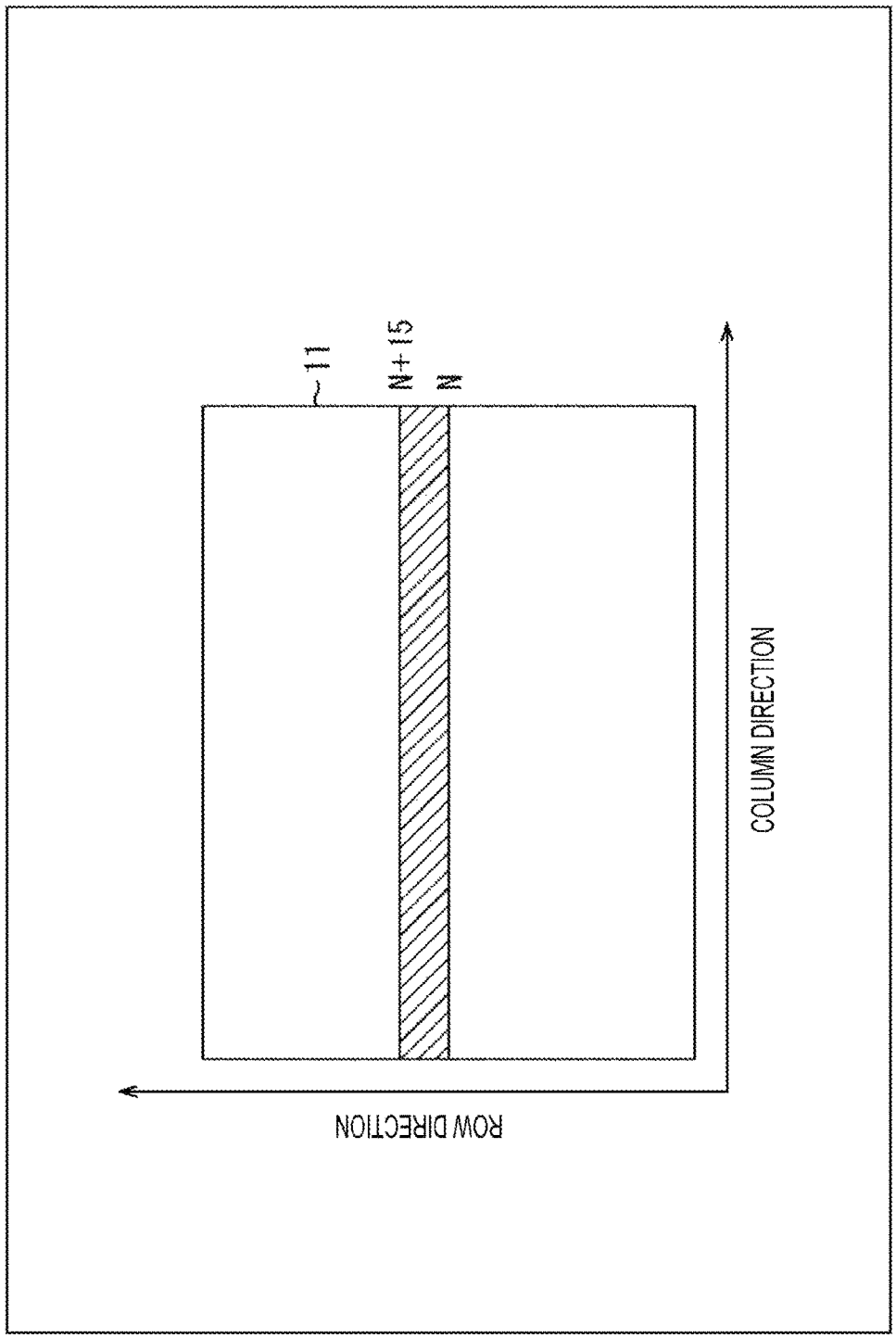
FIG. 10 is a diagram illustrating a physical image of a pixel array.

FIG. 10 is a diagram illustrating a physical image of the pixel array 11 in the horizontal scanning period t of FIG. 9.

In FIG. 10, the horizontal direction represents a column direction, and the vertical direction represents a row direction. This similarly applies to FIGS. 21, 24, and 26 describe below.

As illustrated in FIG. 10, in the horizontal scanning period t of FIG. 9, the N to (N+15)th rows from the head identified by the addresses ADR [N] to ADR [N+15], of the rows of the pixels 51 arranged in the pixel array 11, are generated as the shutter row addresses.

Note that the number of the shutter row addresses generated by the vertical selection decoder 151 at the same time is not limited to sixteen.

(Example of Timing of Various Signals)

Figure 11:
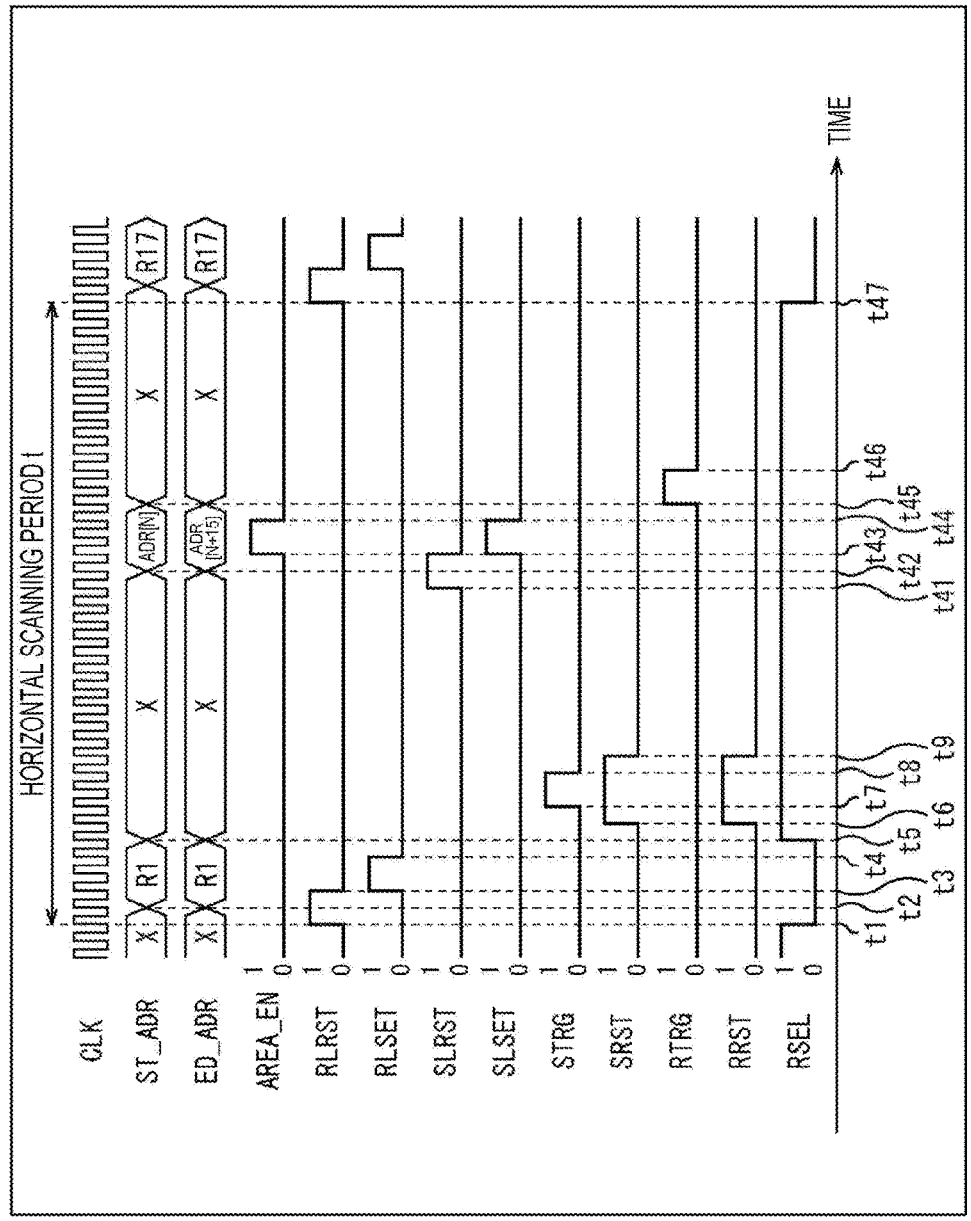
FIG. 11 is a timing chart illustrating an example of timing of various signals generated by a sensor controller of FIG. 7.

FIG. 11 is a timing chart illustrating an example of timing of various signals generated by the sensor controller 152 of FIG. 7.

FIG. 11 illustrates timing of the various signals in the horizontal scanning period t of FIG. 9.

As illustrated in FIG. 11, the sensor controller 152 generates the various signals according to a CLK signal that is a clock signal input from a clock generator (not illustrated), similarly to the sensor controller 20.

Signals generated at times t1 to t9 of FIG. 11 are similar to the signals generated at the times t1 to t9 of FIG. 6 except that the ADR signal is in place of the ST_ADR signal and the ED_ADR signal that specify reading row addresses R1, and thus description is omitted.

At a time t41 of FIG. 11, the sensor controller 152 causes the SLRST signal to transition from 0 to 1. Accordingly, all of S-R latch circuits 123 are reset.

At a time t42, the sensor controller 152 generates the ST_ADR signal that specifies the address ADR [N] as the start address of the shutter row addresses, and the ED_ADR signal that specifies the address ADR [N+15] as the end address of the shutter row addresses.

At a time t43, the sensor controller 152 causes the AREA_EN signal to transition from 0 to 1. Accordingly, the vertical selection decoder 14 generates the addresses ADR [N] to ADR [N+15] as the shutter row addresses.

Further, at a time t43, the sensor controller 152 causes the SLRST signal to transition from 1 to 0, and causes the SLSET signal to transition from 0 to 1. Accordingly, 1 is output and held in only the S-R latch circuits 123 of the addresses ADR [N] to ADR [N+15], of all of the S-R latch circuits 123. At a time t44, the sensor controller 152 causes the AREA_EN signal and the SLSET signal to transition from 1 to 0.

At a time t45, the sensor controller 152 causes the RTRG signal to transition from 0 to 1. Accordingly, a TRG signal to be supplied to the pixel 51 of the reading row address R1 becomes 1. As a result, a reading operation is started. At a time t46, the sensor controller 152 causes the RTRG signal to transition from 1 to 0. Accordingly, the reading operation is terminated. At a time t47, the sensor controller 152 causes the RSEL signal to transition from 1 to 0, and then a next horizontal scanning period t+1 is started.

As described above, the sensor controller 152 sets the shutter row addresses and the reading row address during one horizontal scanning period by the time-division multiplex method.

Further, the sensor controller 152 generates the ST_ADR signal and the ED_ADR signal only once in order to set the shutter row addresses. Therefore, the time required to set the shutter row addresses is the time from the time t41 to the time t45 regardless of the number of the shutter row addresses to be set. Therefore, one horizontal scanning period can be shortened, and a frame rate can be improved.

In contrast, as illustrated in FIG. 6, in the case of inputting the ADR signal that specifies the representative shutter row addresses to the vertical selection decoder 14, the time required to set the sixteen shutter row addresses is the time from the time t10 to the time t23, which is longer than the time from the time t41 to the time t45. Further, the time required to set the shutter row addresses becomes longer as the number of the shutter row addresses to be set is larger.

Further, the sensor controller 152 controls imaging not to perform specification of the addresses and the reading operation at the same time. Therefore, quality of a pixel signal can be improved.

(Description of Processing of CMOS Image Sensor)

Figure 12:
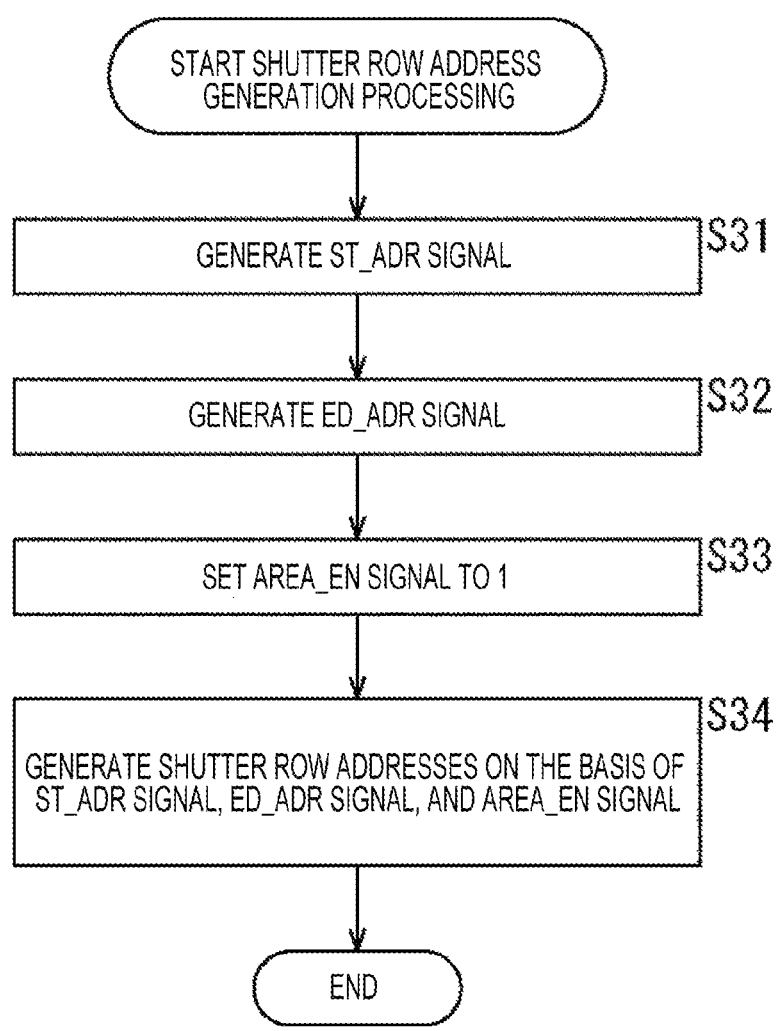
FIG. 12 is a flowchart for describing shutter row address generation processing of the CMOS image sensor of FIG. 7.

FIG. 12 is a flowchart for describing shutter row address generation processing of the CMOS image sensor 150 of FIG. 7.

In step S31 of FIG. 12, the sensor controller 152 of the CMOS image sensor 150 generates the signal that specifies the start address of the shutter row addresses, as the ST_ADR signal, and supplies the generated signal to the vertical selection decoder 151. In step S32, the sensor controller 152 generates the signal that specifies the end address of the shutter row addresses, as the ED_ADR signal, and supplies the generated signal to the vertical selection decoder 151.

In step S33, the sensor controller 152 sets the AREA_EN signal to 1, and supplies the signal to the vertical selection decoder 151. In step S34, the vertical selection decoder 151 generates the addresses in the range from the start address specified by the ST_ADR signal to the end address specified by the ED_ADR signal, as the shutter row addresses, on the basis of the ST_ADR signal, the ED_ADR signal, and the AREA_EN signal. Then, the processing is terminated.

As described above, the CMOS image sensor 150 generates the shutter row addresses on the basis of the ST_ADR signal and the ED_ADR signal, and thus can set a larger number of shutter row addresses at the same time. Therefore, even if the number of pixels of the CMOS image sensor 150 is large, a high frame rate can be achieved without performing the specification of the addresses and the reading operation at the same time. As a result, a high-quality pixel signal can be output at a high frame rate.

Note that, in the above description, the number of the shutter row addresses to be set within one horizontal scanning period is constant (15 in the example of FIG. 9). However, as illustrated in FIG. 13, the number may be variable.

Figure 13:
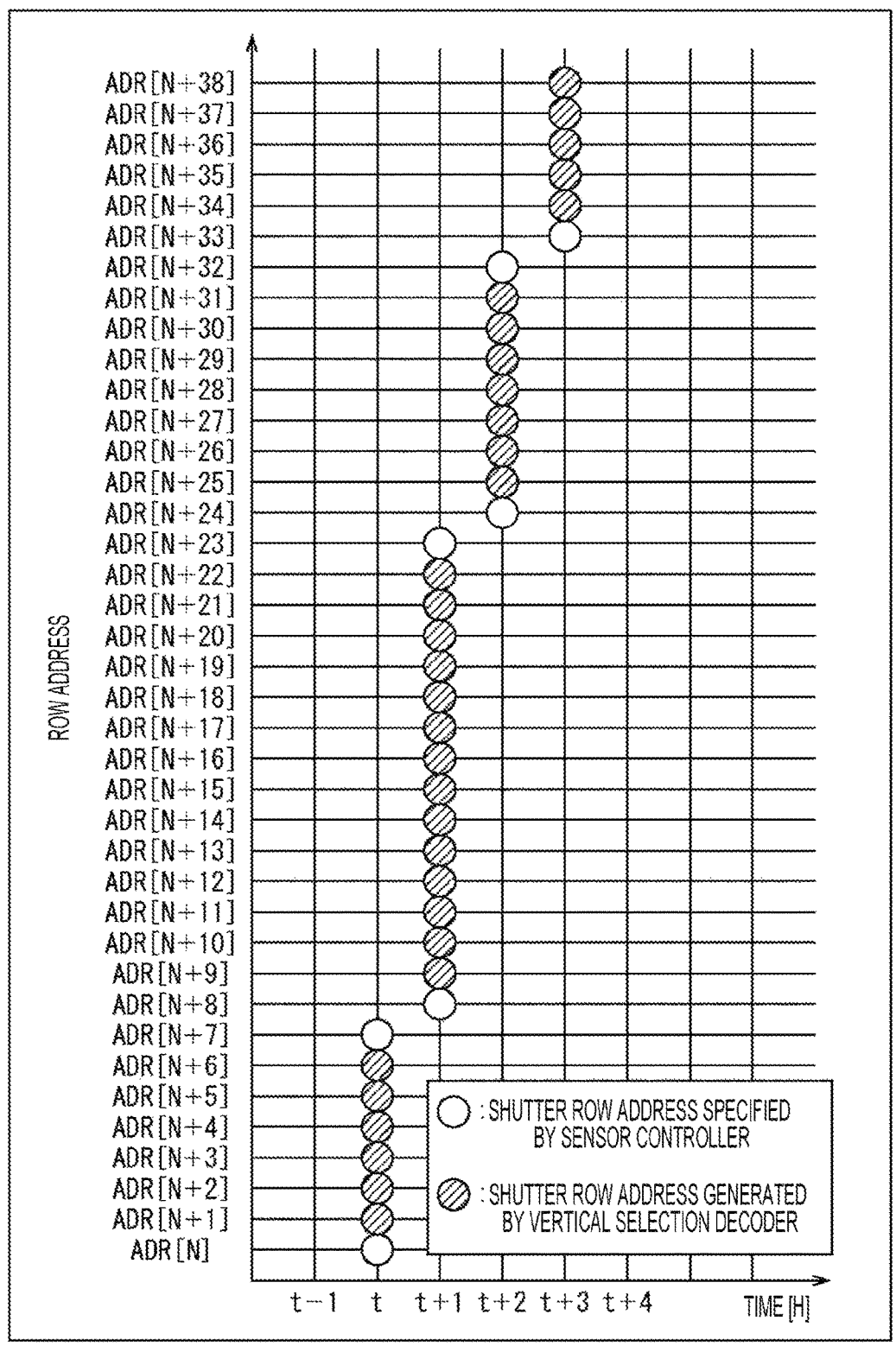
FIG. 13 is a diagram for describing another example of the shutter row addresses generated by the vertical selection decoder.

In the example of FIG. 13, in the horizontal scanning period t, the start address of the shutter row addresses is the address ADR [N], and the end address is the address ADR [N+7]. Therefore, the shutter row addresses generated by the vertical selection decoder 151 are the addresses ADR [N] to ADR [N+7], and the number of the shutter row addresses is eight.

Meanwhile, in the horizontal scanning period t+1, the start address of the shutter row addresses is the address ADR [N+8], and the end address is an address ADR [N+23]. Therefore, the shutter row addresses generated by the vertical selection decoder 151 are the addresses ADR [N+8] to ADR [N+23], and the number of the shutter row addresses is sixteen.

Further, in a horizontal scanning period t+2, the start address of the shutter row addresses is an address ADR [N+24], and the end address is an address ADR [N+32]. Therefore, the shutter row addresses generated by the vertical selection decoder 151 are the addresses ADR [N+24] to ADR [N+32], and the number of the shutter row addresses is nine.

Figure 14:
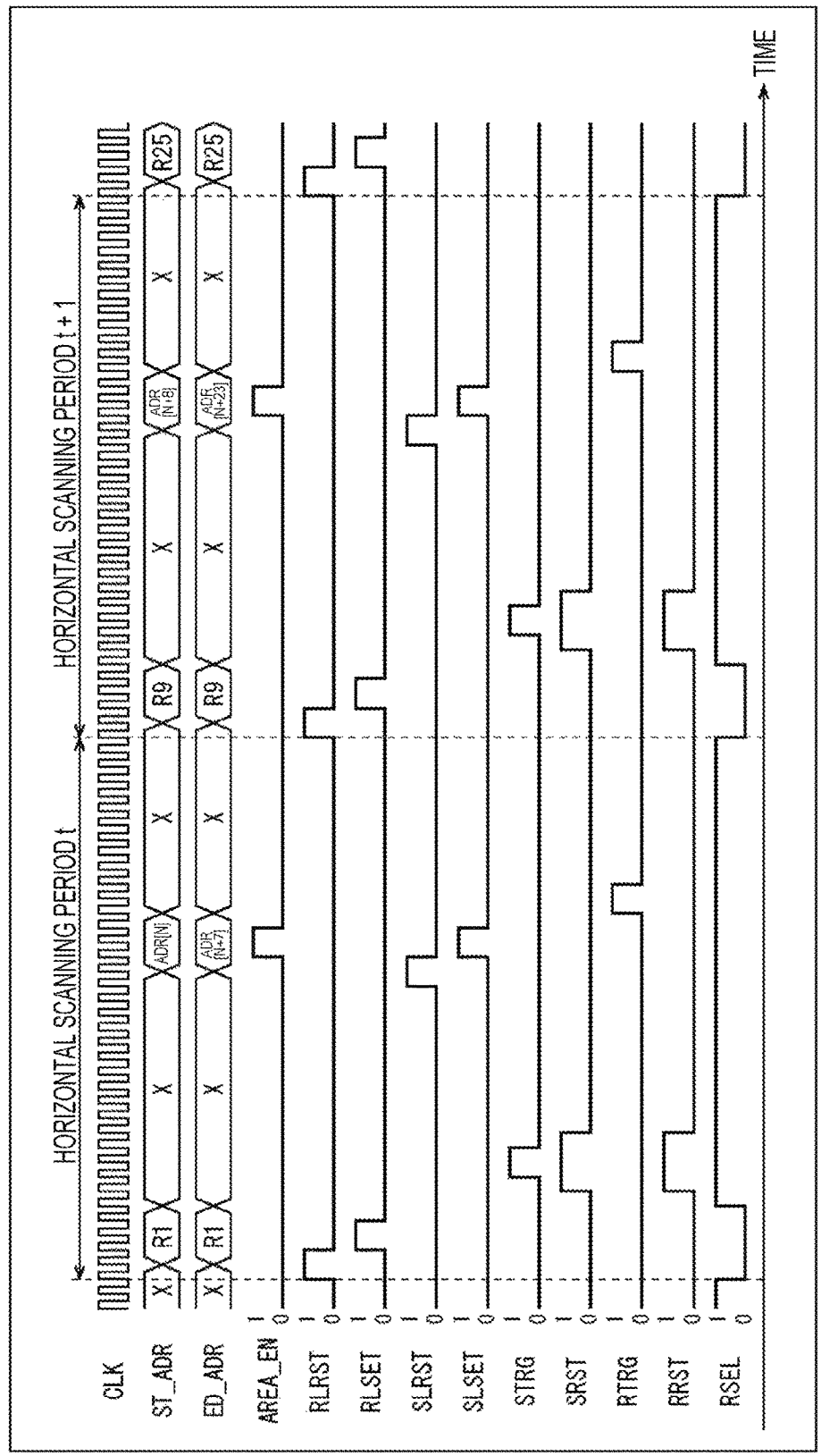
FIG. 14 is a timing chart illustrating another example of the timing of various signals generated by the sensor controller of FIG. 7.

In this case, a timing chart that indicates an example of timing of various signals generated by the sensor controller 152 in the horizontal scanning periods t and t+1 is illustrated in FIG. 14.

As illustrated in FIG. 14, in the horizontal scanning period t, to set the eight addresses ADR [N] to ADR [N+7] as the shutter row addresses, the ST_ADR signal that specifies the address ADR [N] as the start address of the shutter row addresses and the ED_ADR signal that specifies the address ADR [N+7] as the end address are generated.

Further, in the horizontal scanning period t+1, to set the sixteen addresses ADR [N+8] to ADR [N+23] as the shutter row addresses, the ST_ADR signal that specifies the address ADR [N+8] as the start address of the shutter row addresses and the ED_ADR signal that specifies the address ADR [N+23] as the end address are generated.

As described above, the addresses necessary to set the shutter row addresses are two of the start address and the end address of the shutter row addresses regardless of the number of the shutter row addresses to be set within one horizontal scanning period. Therefore, even if the numbers of the shutter row addresses within one horizontal scanning period are different, the CMOS image sensor 150 can be easily designed.

Figure 15:
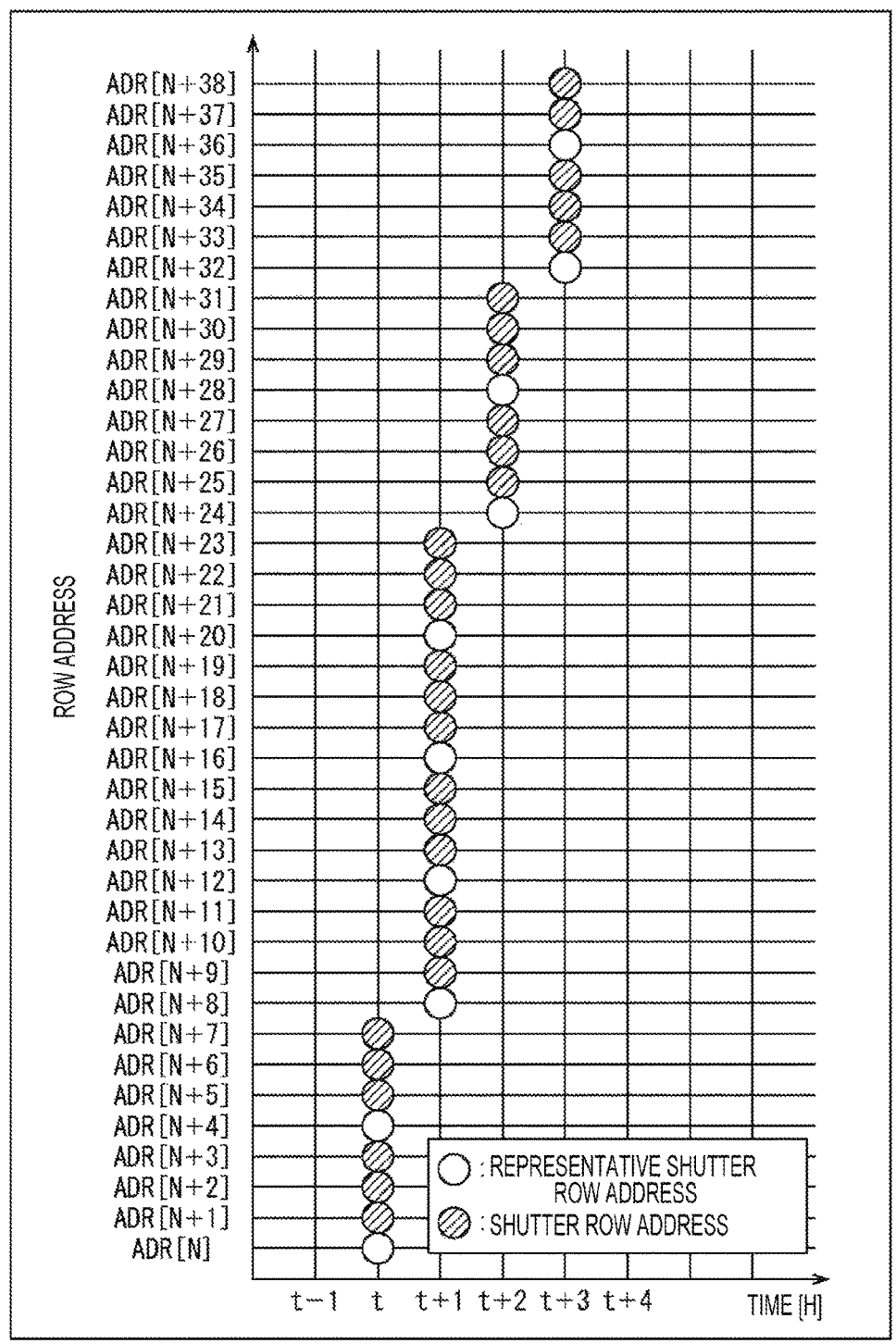
FIG. 15 is a diagram for describing representative shutter row addresses.
Figure 16:
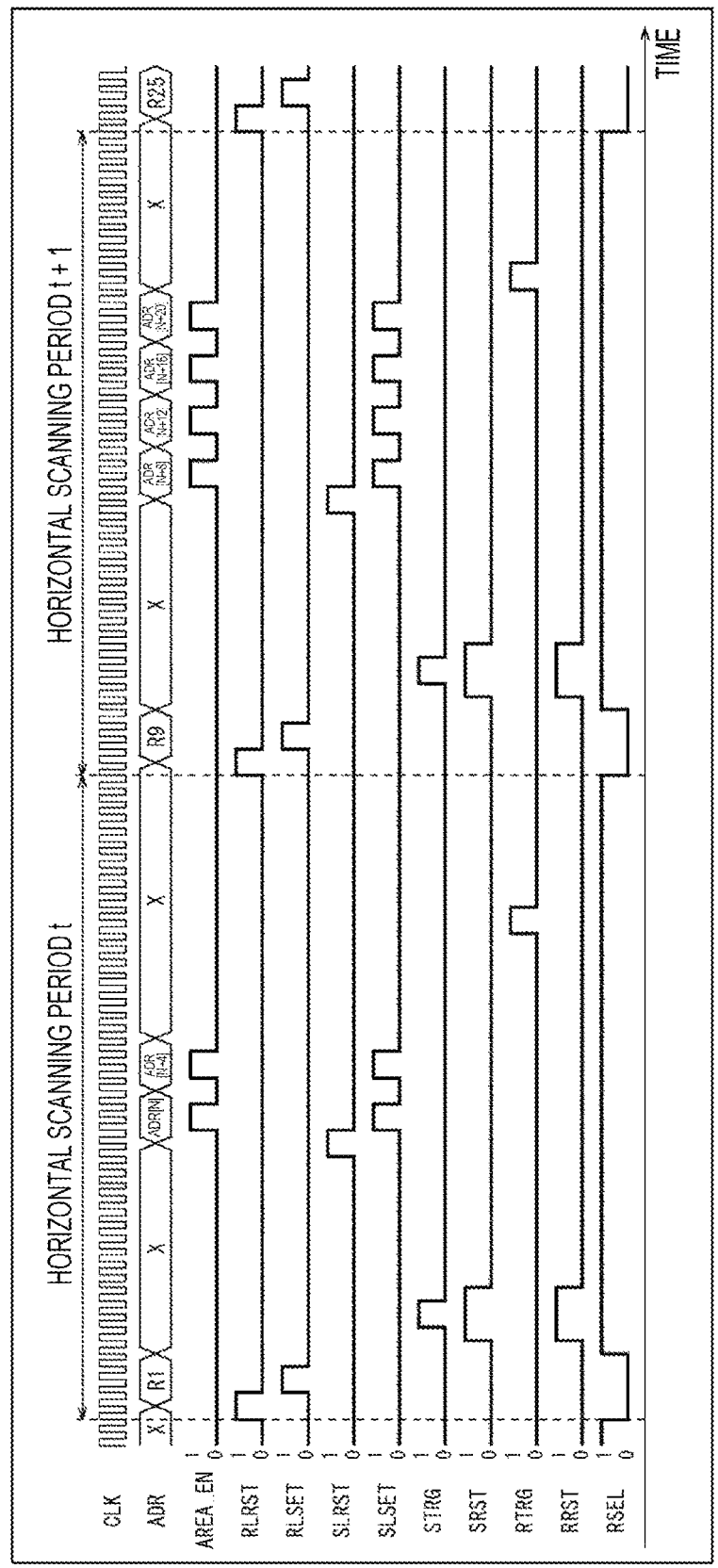
FIG. 16 is a timing chart illustrating another example of the timing of various signals generated by the sensor controller of FIG. 1.

In contrast, in the CMOS image sensor 10 of FIG. 1, the addresses necessary to set the shutter row addresses are changed depending on the number of the shutter row addresses to be set, as illustrated in FIGS. 15 and 16.

FIG. 15 is a diagram for describing representative shutter row addresses when setting the same shutter row addresses as those of FIG. 13 in horizontal scanning periods t to t+3. FIG. 16 is a timing chart of an example of timing of various signals generated by the sensor controller 20 when setting the same shutter row addresses as those of FIG. 13 in the horizontal scanning periods t and t+1.

As illustrated in FIGS. 15 and 16, when setting the addresses ADR [N] to ADR [N+7] as the shutter row addresses in the horizontal scanning period t, the sensor controller 20 generates the ADR signal that specifies the addresses ADR [N] and ADR [N+4] as the representative shutter row addresses.

Further, as illustrated in FIG. 15, when setting the addresses ADR [N+24] to ADR [N+31] as the shutter row addresses in the horizontal scanning period t+2, the sensor controller 20 generates the ADR signal that specifies the addresses ADR [N+24] and ADR [N+28] as the representative shutter row addresses. As described above, the number of the addresses necessary to set eight shutter row addresses is two.

Meanwhile, as illustrated in FIGS. 15 and 16, when setting the addresses ADR [N+8] to ADR [N+23] as the shutter row addresses in the horizontal scanning period t+1, the sensor controller 20 generates the ADR signal that specifies the addresses ADR [N+8], ADR [N+12], ADR [N+16], and ADR [N+20] as the representative shutter row addresses. As described above, the number of the addresses necessary to set sixteen shutter row addresses is four.

Therefore, when the numbers of the shutter row addresses to be set within one horizontal scanning period are different, design of the CMOS image sensor 10 is difficult.

Second Embodiment (Configuration Example of Second Embodiment of CMOS Image Sensor)

Figure 17:
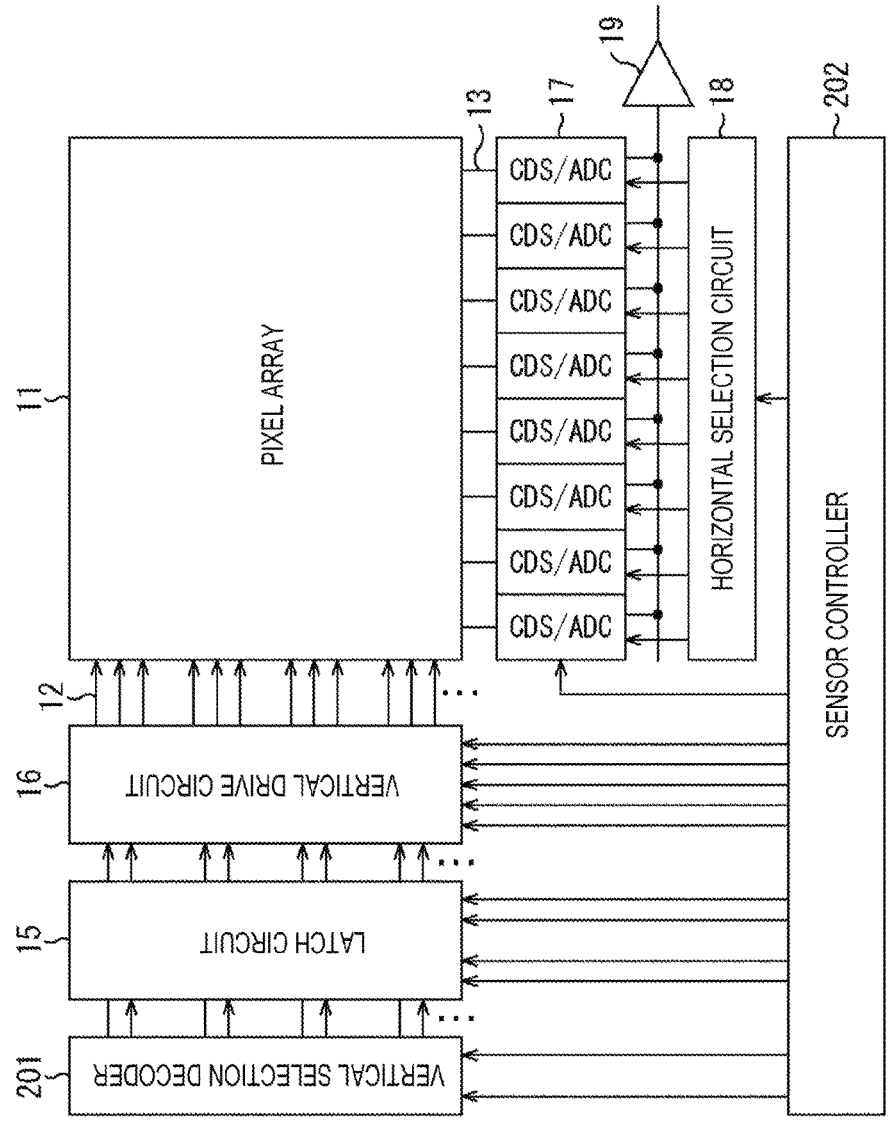
FIG. 17 is a diagram illustrating a configuration example of a second embodiment of a CMOS image sensor to which the present disclosure is applied.

FIG. 17 is a diagram illustrating a configuration example of a second embodiment of a CMOS image sensor to which the present disclosure is applied.

The same configuration as the configuration of FIG. 7, of configurations illustrated in FIG. 17, is denoted with the same reference sign. Overlapping description is appropriately omitted.

The configuration of a CMOS image sensor 200 of FIG. 17 is different from the configuration of the CMOS image sensor 150 of FIG. 7 in that the vertical selection decoder 151 is in place of a vertical selection decoder 201, and the sensor controller 152 is in place of a sensor controller 202. In the CMOS image sensor 200, transition time of an ST_ADR signal and an ED_ADR signal is short, and generation of wrong shutter row addresses on the basis of the ST_ADR signal and the ED_ADR signal is not concerned at the time of transition, and thus an AREA_EN signal is not generated.

To be specific, the ST_ADR signal and the ED_ADR signal are supplied from the sensor controller 202 to the vertical selection decoder 201 of the CMOS image sensor 200. The vertical selection decoder 201 generates the shutter row addresses and a reading row address on the basis of the ST_ADR signal and the ED_ADR signal, and supplies the generated addresses to a latch circuit 15.

The sensor controller 202 controls imaging by the CMOS image sensor 200 by generating various signals. To be specific, the sensor controller 202 generates the ST_ADR signal and the ED_ADR signal, and supplies the generated signals to the vertical selection decoder 201. Further, the sensor controller 202 generates an RLSET signal, an RLSET signal, an SLRST signal, and an SLSET signal, and supplies the generated signals to the latch circuit 15. Further, the sensor controller 202 generates an STRG signal, an SRST signal, an RTRG signal, an RRST signal, and an RSEL signal, and supplies the generated signals to a vertical drive circuit 16.

(Configuration Example of Vertical Selection Decoder)

Figure 18:
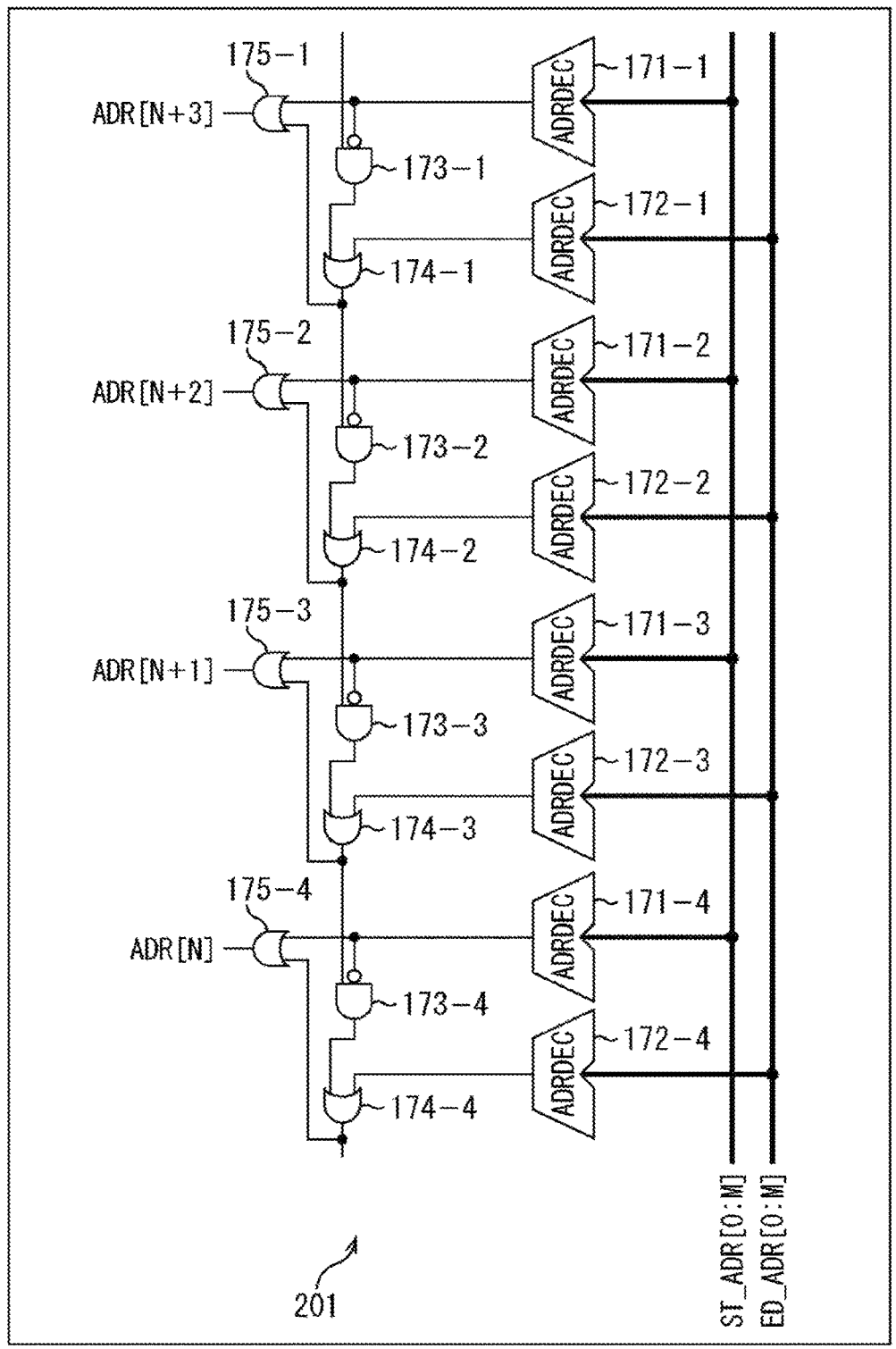
FIG. 18 is a diagram illustrating a configuration example of a vertical selection decoder of FIG. 17.

FIG. 18 is a diagram illustrating a configuration example of the vertical selection decoder 201 of FIG. 17.

The same configuration as the configuration of FIG. 8, of configurations illustrated in FIG. 18, is denoted with the same reference sign. Overlapping description is appropriately omitted.

The configuration of the vertical selection decoder 201 of FIG. 18 is the same as the configuration of the vertical selection decoder 151 of FIG. 8 except that the AREA_EN signal is not supplied to AND circuits 173-1 to 173-4.

An operation to generate the shutter row addresses and the reading row address in the vertical selection decoder 201 is the same as the case in which the AREA_EN signal is 1 in the vertical selection decoder 151 of FIG. 8. As a result, addresses in a range from a start address specified by the ST_ADR signal to an end address specified by the ED_ADR signal are generated as the shutter row addresses and the reading row address.

Third Embodiment (Configuration Example of Third Embodiment of CMOS Image Sensor)

Figure 19:
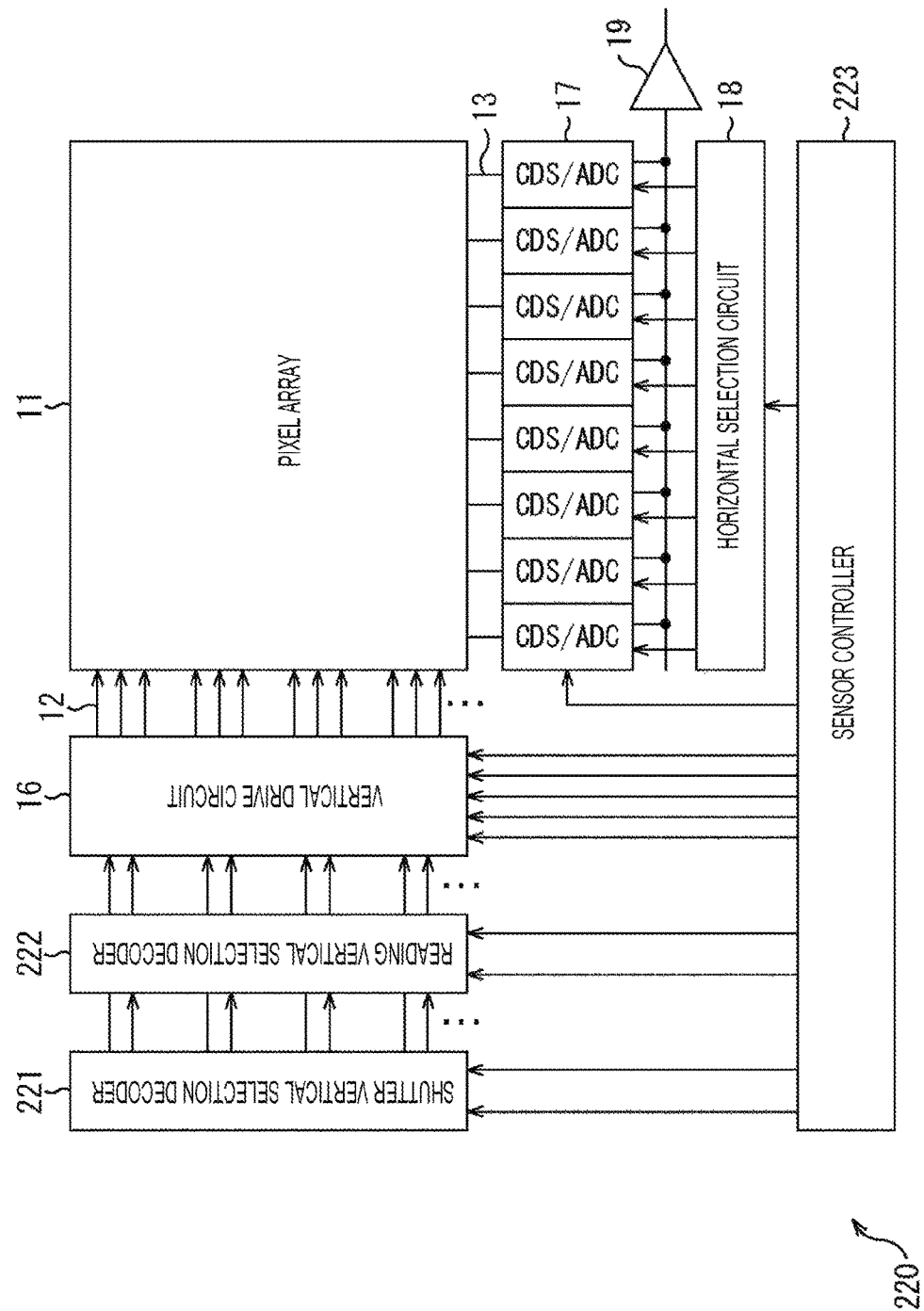
FIG. 19 is a block diagram illustrating a configuration example of a third embodiment of a CMOS image sensor to which the present disclosure is applied.

FIG. 19 is a block diagram illustrating a configuration example of a third embodiment of a CMOS image sensor to which the present disclosure is applied.

The same configuration as the configuration of FIG. 17, of configurations illustrated in FIG. 19, is denoted with the same reference sign. Overlapping description is appropriately omitted.

The configuration of the CMOS image sensor 220 of FIG. 19 is different from the configuration of the CMOS image sensor 200 of FIG. 17 in that a shutter vertical selection decoder 221 and a reading vertical selection decoder 222 are provided in place of the vertical selection decoder 201, a controller 2223 is provided in place of the sensor controller 20, and no latch circuit 15 is provided.

In the CMOS image sensor 220, the shutter vertical selection decoder 221 that generates the shutter row addresses and the reading vertical selection decoder 222 that generates the reading row address are separately provided. Therefore, it is not necessary to hold the shutter row addresses and the reading row address generated by time division, and the latch circuit 15 is not provided.

To be specific, an ST_SADR signal that indicates a start address of successive shutter row addresses is supplied from a sensor controller 223 to the shutter vertical selection decoder 221 of the CMOS image sensor 220. Further, an ED_SADR signal that indicates an end address of the successive shutter row addresses is supplied from the sensor controller 223 to the shutter vertical selection decoder 221. The shutter vertical selection decoder 221 generates the shutter row addresses on the basis of the ST_SADR signal and the ED_SADR signal supplied from the sensor controller 223, and supplies the generated signals to a vertical drive circuit 16.

An ST_RADR signal that indicates a start address of reading row addresses of one row is supplied from the sensor controller 223 to the reading vertical selection decoder 222. Further, an ED_RADR signal that indicates an end address of the reading row addresses of one row is supplied from the sensor controller 223 to the reading vertical selection decoder 222. The reading vertical selection decoder 222 generates the reading row addresses of one row on the basis of the ST_RADR signal and the ED_RADR signal supplied from the sensor controller 223, and supplies the generated addresses to the vertical drive circuit 16.

The sensor controller 223 controls imaging by the CMOS image sensor 220 by generating various signals. To be specific, the sensor controller 223 generates the ST_SADR signal and the ED_SADR signal, and supplies the generated signals to the shutter vertical selection decoder 221. Further, the sensor controller 223 generates the ST_RADR signal and the ED_RADR signal, and supplies the generated signals to the reading vertical selection decoder 222. Further, the sensor controller 223 generates an STRG signal, an SRST signal, an RTRG signal, an RRST signal, and an RSEL signal, and supplies the generated signals to the vertical drive circuit 16.

Note that the configurations of the shutter vertical selection decoder 221 and the reading vertical selection decoder 222 are the same as the configuration of the vertical selection decoder 201 of FIG. 18, and thus description is omitted.

Fourth Embodiment (Configuration Example of Fourth Embodiment of CMOS Image Sensor)

Figure 20:
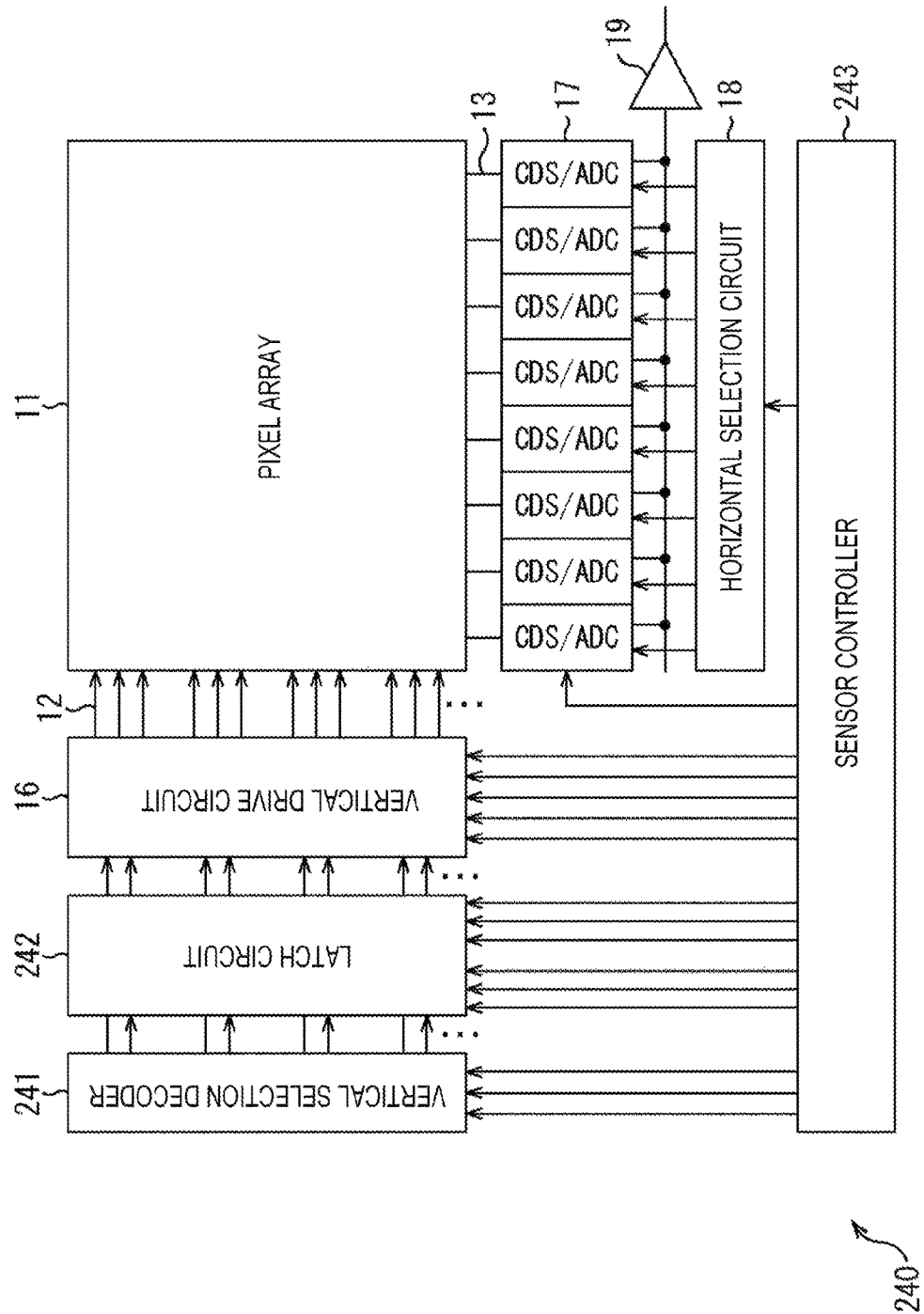
FIG. 20 is a block diagram illustrating a configuration example of a fourth embodiment of a CMOS image sensor to which the present disclosure is applied.

FIG. 20 is a block diagram illustrating a configuration example of a fourth embodiment of a CMOS image sensor to which the present disclosure is applied.

The same configuration as the configuration of FIG. 7, of configurations illustrated in FIG. 20, is denoted with the same reference sign. Overlapping description is appropriately omitted.

The configuration of a CMOS image sensor 240 of FIG. 20 is different from the configuration of the CMOS image sensor 150 of FIG. 7 in that a vertical selection decoder 241, a latch circuit 242, and a sensor controller 243 are provided in place of the vertical selection decoder 151, the latch circuit 15, and the sensor controller 152. The CMOS image sensor 240 divides row of pixels 51 into two groups, and performs a reading operation and an electronic shutter operation of the pixels 51 in each group. That is, the CMOS image sensor 240 scans a pixel array 11 along two types of scanning lines.

To be specific, the vertical selection decoder 241 of the CMOS image sensor 240 is similarly configured to the vertical selection decoder 151 of FIG. 8. An ST_ADR signal that indicates a start address of successive shutter row addresses, a reading row address, an invalid shutter row address, or an invalid reading row address is supplied from the sensor controller 243 to the vertical selection decoder 241. The invalid shutter row address is an address that identifies a row of pixels in which the electronic shutter operation is made invalid, and the invalid reading row address is an address that identifies a row of pixels in which the reading operation is made invalid.

Further, an ED_ADR signal that indicates an end address of the successive shutter row addresses, the reading row address, the invalid shutter row address, or the invalid reading row address is supplied from the sensor controller 243 to the vertical selection decoder 241. Further, an AREA_EN signal is supplied from the sensor controller 243 to the vertical selection decoder 241. The vertical selection decoder 241 generates the shutter row addresses, the reading row address, the invalid shutter row address, or the invalid reading row address on the basis of the ST_ADR signal, the ED_ADR signal, and the AREA_EN signal, and supplies the generated addresses to a latch circuit 242.

An RLRST signal, an RLSET signal, an RLCNCL signal, an SLRST signal, an SLSET signal, and an SLCNCL signal are supplied from the sensor controller 243 to the latch circuit 242. The RLCNCL signal is a pulse signal that indicates whether the address supplied from the vertical selection decoder 241 is the invalid reading row address. The RLCNCL signal is 1 when the signal indicates that the address supplied from the vertical selection decoder 241 is the invalid reading row address, and is 0 when the signal indicates that the address is not the invalid reading row address.

Further, the SLCNCL signal is a pulse signal that indicates whether the address supplied from the vertical selection decoder 241 is the invalid shutter row address. The RLCNCL signal is 1 when the signal indicates that the address supplied from the vertical selection decoder 241 is the invalid shutter row address, and is 0 when the signal indicates that the address is not the invalid shutter row address.

The latch circuit 242 makes the held reading row address clear when the RLRST signal supplied from the sensor controller 243 becomes 1. Further, the latch circuit 242 makes the held invalid reading row address clear when the RLCNCL signal becomes 1.

Further, the latch circuit 242 holds the address supplied from a vertical selection decoder 14 as the reading row address when the RLSET signal supplied from the sensor controller 243 becomes 1. The latch circuit 242 sets the held reading row address to the current reading row address by supplying the held reading row address to a vertical drive circuit 16.

Further, the latch circuit 242 makes the held shutter row addresses clear when the SLRST signal supplied from the sensor controller 243 becomes 1. Further, the latch circuit 242 makes the held shutter row addresses clear when the SLRST signal becomes 1.

Further, the latch circuit 242 holds the addresses supplied from the vertical selection decoder 14 as the shutter row addresses when the SLSET signal supplied from the sensor controller 243 becomes 1. The latch circuit 242 sets the held shutter row addresses to the current shutter row addresses by supplying the held shutter row addresses to the vertical drive circuit 16.

As described above, the vertical selection decoder 151 and the latch circuit 242 function as an address setting unit, and sets the reading row address on the basis of the ST_ADR signal, the ED_ADR signal, and the RLCNCL signal. Further, the vertical selection decoder 151 and the latch circuit 242 function as an address setting unit, and sets the shutter row addresses other than the invalid shutter row address on the basis of the ST_ADR signal, the ED_ADR signal, and the SLCNCL signal.

The sensor controller 243 controls imaging by the CMOS image sensor 240 by generating various signals. To be specific, the sensor controller 243 generates the ST_ADR signal, the ED_ADR signal, and the AREA_EN signal, and supplies the generated signals to the vertical selection decoder 14.

Further, the sensor controller 243 generates the RLCNCL signal, the RLRST signal, the RLSET signal, the SLCNCL signal, the SLRST signal, and the SLSET signal, and supplies the generated signals to the latch circuit 242. Further, the sensor controller 243 generates an STRG signal, an SRST signal, an RTRG signal, an RRST signal, and an RSEL signal, and supplies the generated signals to the vertical drive circuit 16.

(Description of Scanning Lines of Groups)

Figure 21:
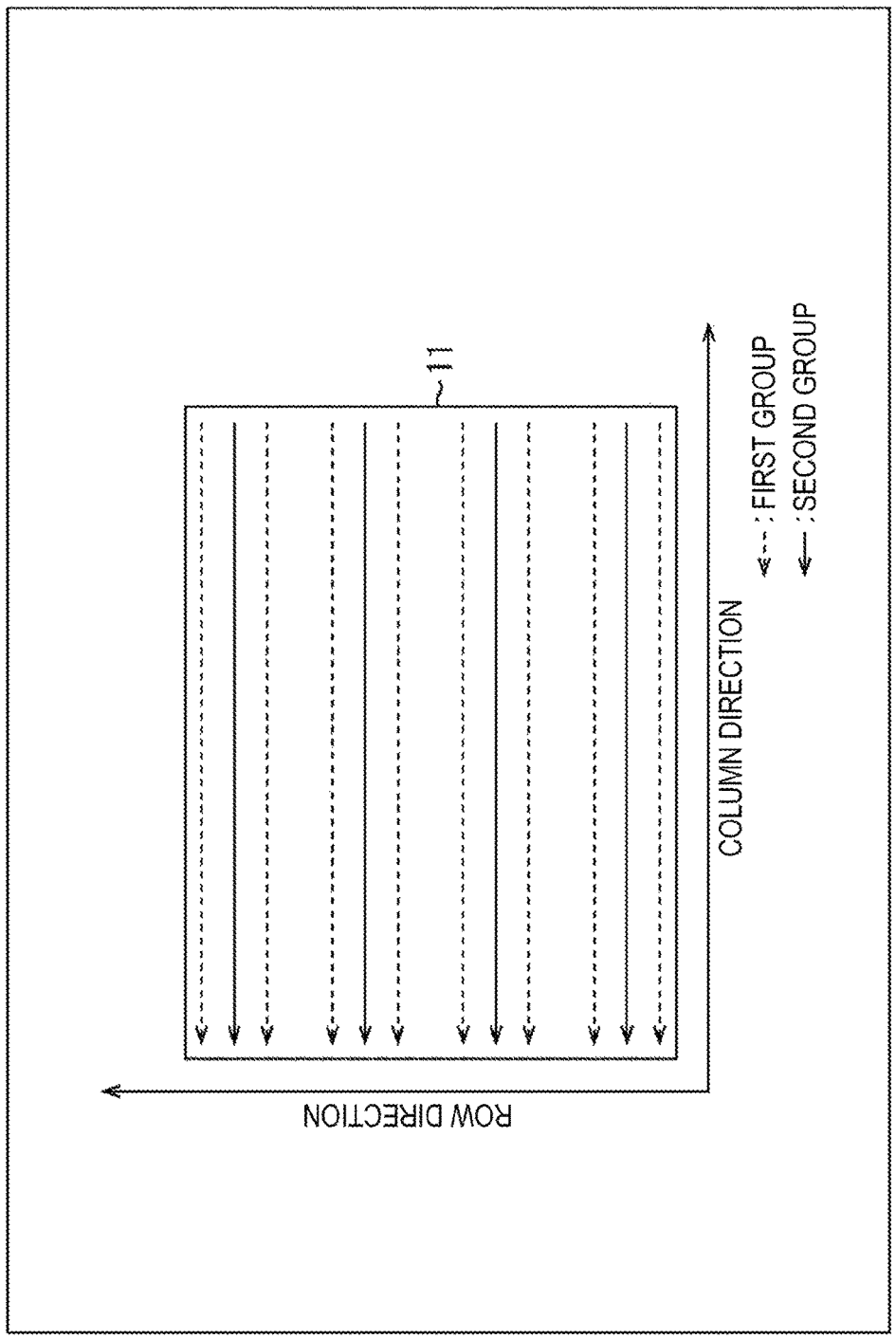
FIG. 21 is a diagram for describing scanning lines of groups of pixels.

FIG. 21 is a diagram illustrating the scanning lines of the groups of the pixels 51.

Note that, in FIG. 21, the dotted-line arrows represent rows of the reading row addresses of the first group, of the two groups of the pixels 51, and the solid-line arrows represent rows of the reading row addresses of the second group. This similarly applies to FIGS. 24 and 26 described below.

In the example of FIG. 21, the rows of the reading row addresses of the first group are eight, and the rows of the reading row addresses of the second group are four. That is, the number of the scanning lines of the first group is twice the scanning lines of the second group.

As a method of classifying the groups, for example, there is a method of classifying the pixels 51 for imaging and the pixels 51 for phase difference detection into separate groups.

(Configuration Example of Latch Circuit and Vertical Drive Circuit)

Figure 22:
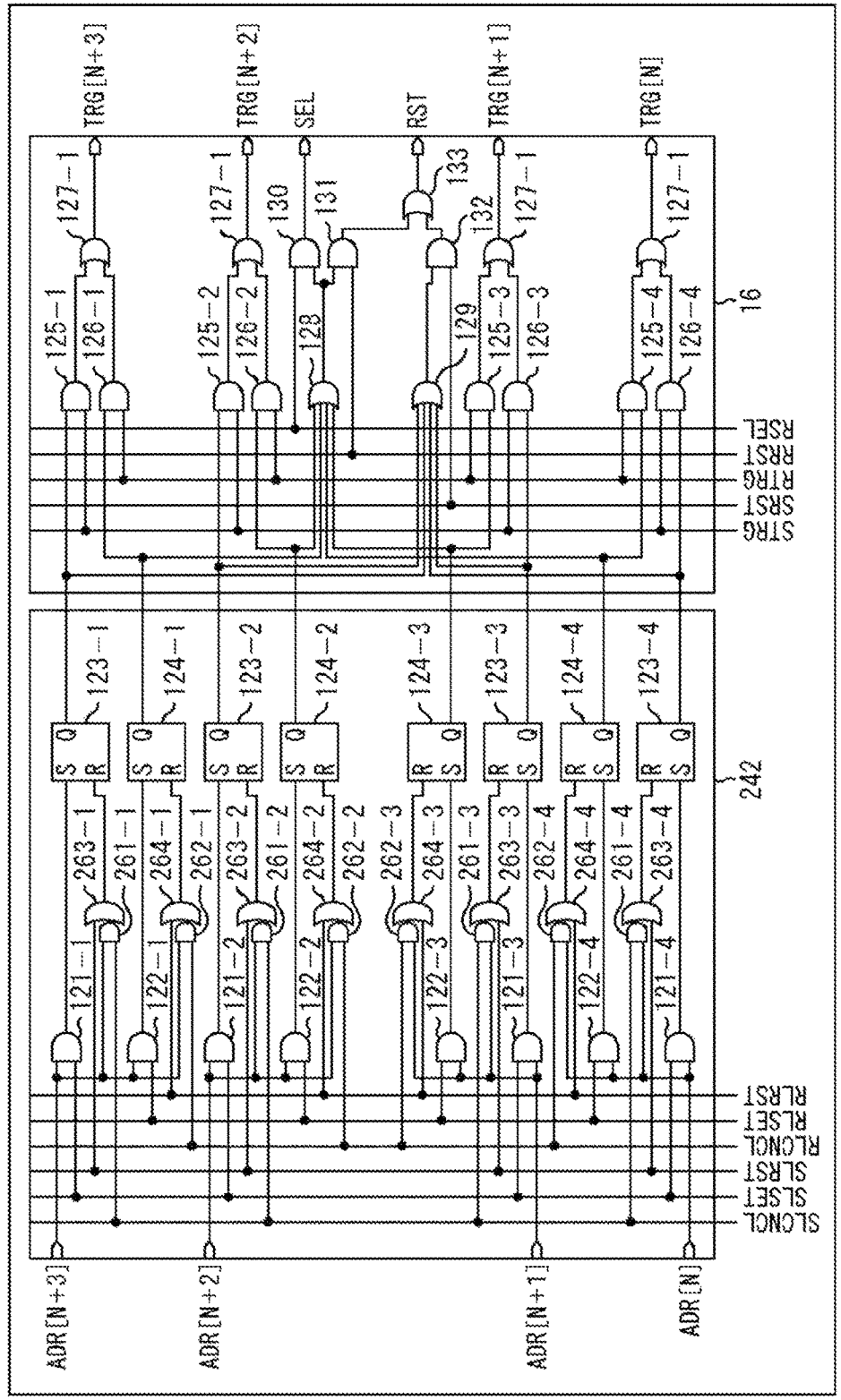
FIG. 22 is a diagram illustrating a configuration example of a latch circuit and a vertical drive circuit of FIG. 20.

FIG. 22 is a diagram illustrating a configuration example of the latch circuit 242 and the vertical drive circuit 16 of FIG. 20.

The same configuration as the configuration of FIG. 5, of configurations illustrated in FIG. 22, is denoted with the same reference sign. Overlapping description is appropriately omitted.

The configuration of the latch circuit 242 of FIG. 22 is different from the configuration of the latch circuit 15 of FIG. 5 in that AND circuits 261-1 to 261-4 and 262-1 to 262-4, and OR circuits 263-1 to 263-4 and 264-1 to 264-4 are newly provided. The configuration of the vertical drive circuit 16 of FIG. 22 is the same as the configuration of the vertical drive circuit 16 of FIG. 5, and thus description is omitted.

AND circuits 121-1, 122-1, 261-1, and 262-1, the OR circuits 263-1 and 264-1, and S-R latch circuits 123-1 and 124-1 are circuits corresponding to a row of an address ADR [N+3]. Similarly, AND circuits 121-2, 122-2, 261-2, and 262-2, the OR circuits 263-2 and 264-2, and S-R latch circuits 123-2 and 124-2 are circuits corresponding to a row of an address ADR [N+2].

Further, AND circuits 121-3, 122-3, 261-3, and 262-3, the OR circuits 263-3 and 264-3, and S-R latch circuits 123-3 and 124-3 are circuits corresponding to a row of an address ADR [N+1]. AND circuits 121-4, 122-4, 261-4, and 262-4, the OR circuits 263-4 and 264-4, and S-R latch circuits 123-4 and 124-4 are circuits corresponding to a row of an address ADR [N].

The AND circuits 261-1 to 261-4, the AND circuits 262-1 to 262-4, the OR circuits 263-1 to 263-4, and the OR circuits 264-1 to 264-4 perform similar processing except that the corresponding rows are different. Therefore, hereinafter, only the processing of the AND circuits 261-1 and 262-1, and the OR circuits 263-1 and 264-1 will be described.

The SLCNCL signal is input from the sensor controller 243 to the AND circuit 261-1, and a signal that indicates existence/non-existence of generation of the address ADR [N+3] is input from am OR circuit 175-1 (FIG. 8) of the vertical selection decoder 151 to the AND circuit 261-1. The AND circuit 261-1 performs logical product calculation of the input signals, and supplies a result of the logical product calculation to the OR circuit 263-1.

The OR circuit 263-1 performs logical sum calculation of the signal supplied from the AND circuit 261-1 and the SLRST signal supplied from the sensor controller 243, and inputs a result of the logical sum calculation to an R port of the S-R latch circuit 123-1.

As described above, when the signal from the OR circuit 175-1 is 1 that indicates existence of generation of the address ADR [N+3], and the SLCNCL signal is 1 that indicates that the address supplied from the vertical selection decoder 241 is the invalid shutter row address, the S-R latch circuit 123-1 is reset. That is, when the address ADR [N+3] is the invalid shutter row address, the S-R latch circuit 123-1 makes the setting of the address ADR [N+3] as the shutter row address invalid. Further, when the SLRST signal is 1 that indicates cancellation of the shutter row address held in the latch circuit 242, the S-R latch circuit 123-1 is reset.

The RLCNCL signal is input from the sensor controller 243 to the AND circuit 262-1, and the signal is input from the OR circuit 175-1 to the AND circuit 262-1. The AND circuit 262-1 performs the logical product calculation of the input signals, and supplies a result of the logical product calculation to the OR circuit 264-1.

The OR circuit 264-1 performs the logical sum calculation of the signal supplied from the AND circuit 262-1, and the RLRST signal supplied from the sensor controller 243, and inputs a result of the logical sum calculation to an R port of the S-R latch circuit 124-1.

As described above, when the signal from the OR circuit 175-1 is 1, and the RLCNCL signal is 1 that indicates that the address supplied from the vertical selection decoder 241 is the invalid reading row address, the S-R latch circuit 124-1 is reset. That is, when the address ADR [N+3] is the invalid reading row address, the S-R latch circuit 124-1 makes setting of the address ADR [N+3] as the reading row address invalid. Further, the RLRST signal is 1 that indicates cancellation of the reading row address held in the latch circuit 242, the S-R latch circuit 124-1 is reset.

(Description of Invalid Shutter Row Address)

Figure 23:
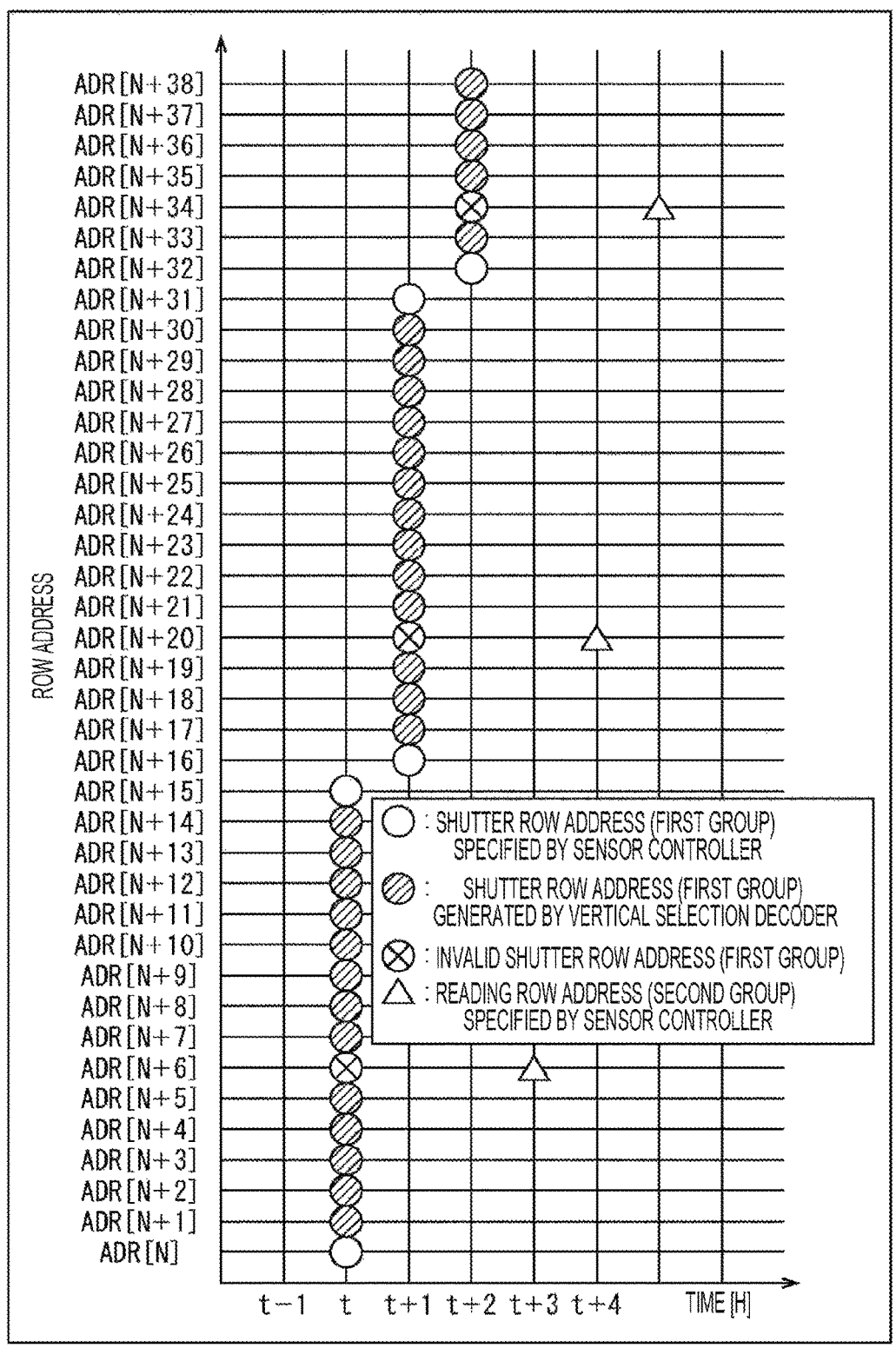
FIG. 23 is a diagram for describing an invalid shutter row address.

FIG. 23 is a diagram for describing the invalid shutter row address.

In FIG. 23, the white circles represent the shutter row addresses specified by the sensor controller 243 in horizontal scanning periods of the first group. The shaded circles represent the shutter row addresses not specified by the sensor controller 243, of the shutter row addresses generated by the vertical selection decoder 151 in the horizontal scanning periods of the first group.

The crossed circles represent the invalid shutter row addresses in the horizontal scanning period of the first group. The triangles represent the reading row addresses specified by the sensor controller 243 in the horizontal scanning period of the second group.

In the example of FIG. 23, horizontal scanning periods t to t+2 are the horizontal scanning periods of the first group, and horizontal scanning periods t+3 to t+5 are the horizontal scanning periods of the second group.

Further, in the horizontal scanning periods of the first group, the reading operation for the pixels 51 of the rows of the first group, and the electronic shutter operation for the pixels 51 of all of the rows are performed. Then, in the horizontal scanning periods t+3 to t+5, the reading operation for the pixels 51 of the rows of the second group, and the electronic shutter operation for the pixels 51 of the rows of the second group are performed.

At this time, the sensor controller 243 specifies the reading row address of the second group, of the shutter row addresses in the horizontal scanning period of the first group, as the invalid shutter row address.

For example, in the horizontal scanning period t of the first group, the start address of the shutter row addresses is the address ADR [N], and the end address is an address ADR [N+15]. Further, an address ADR [N+6] is the reading row address in the horizontal scanning period t+3 of the second group. Therefore, the sensor controller 243 generates the ST_ADR signal that specifies the address ADR [N+6] as the start address of the invalid shutter row address, and the ED_ADR signal that specifies the address ADR [N+6] as the end address of the invalid shutter row address.

Figure 24:
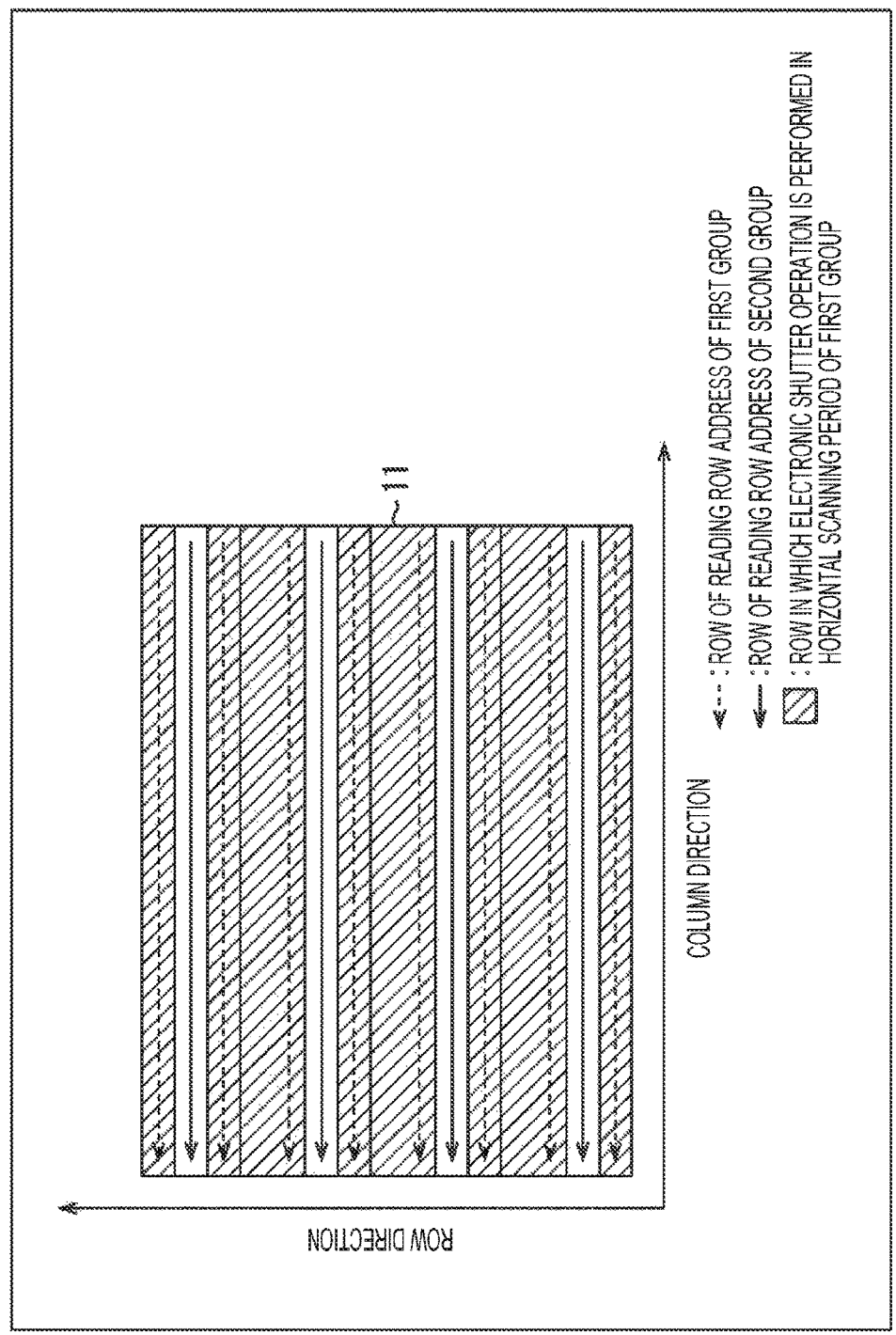
FIG. 24 is a diagram illustrating a position on a pixel array, of a row identified by the invalid shutter row address.

FIG. 24 is a diagram illustrating a position on the pixel array 11, of the row identified by the invalid shutter row address.

In FIG. 24, the shaded portions represent the rows in which the electronic shutter operation is performed in the horizontal scanning period of the first group. This similarly applies to FIG. 26 described below.

As illustrated in FIG. 24, in the horizontal scanning period of the first group, the electronic shutter operation is performed in the rows other than the rows of the reading row addresses of the second group, of all of the rows of the pixels 51 arranged in the pixel array 11.

(Example of Timing of Various Signals)

Figure 25:
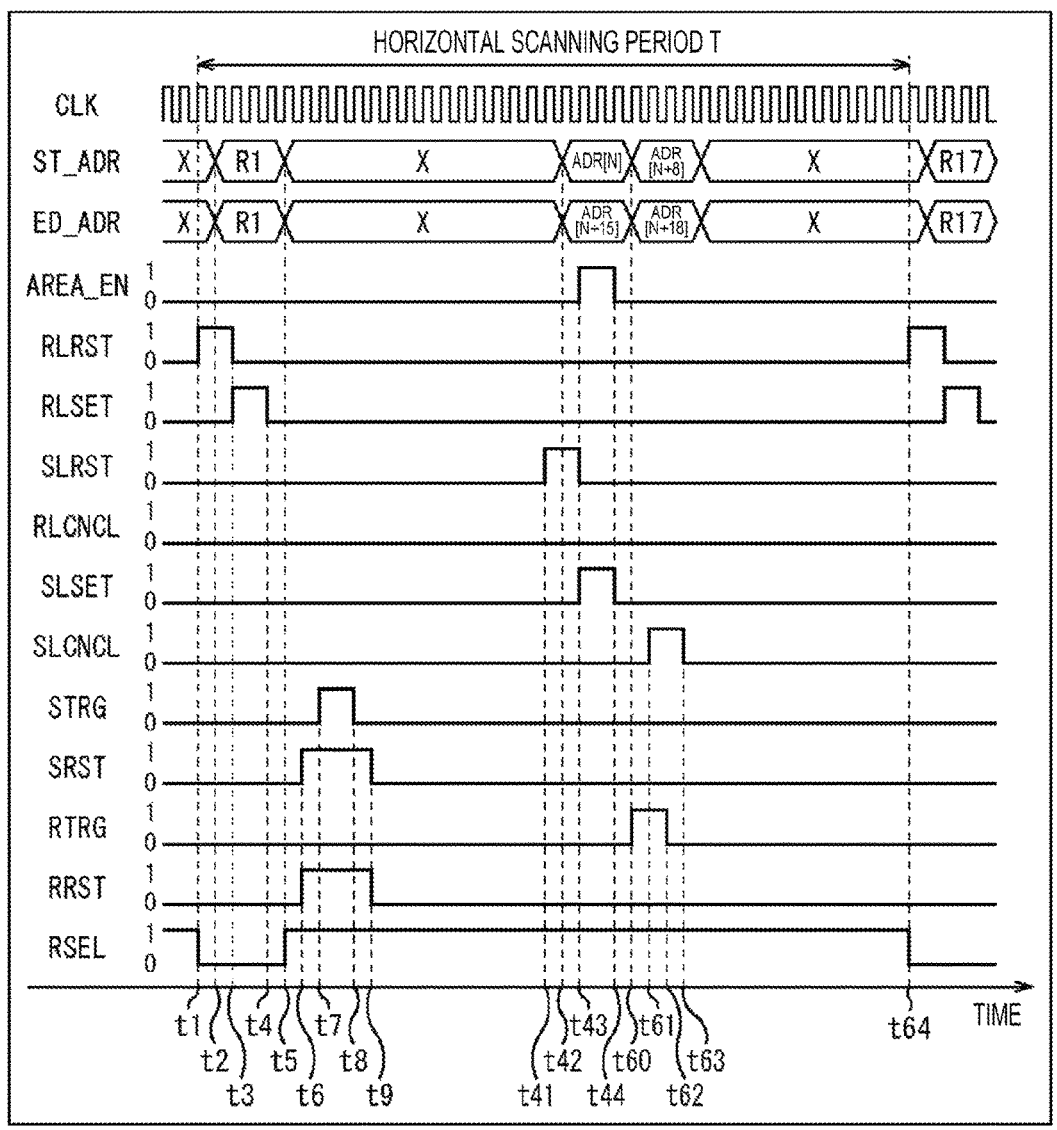
FIG. 25 is a timing chart illustrating an example of timing of various signals generated by a sensor controller of FIG. 20.

FIG. 25 is a timing chart illustrating an example of timing of the various signals generated by the sensor controller 243 of FIG. 20.

Processing at times t1 to t9 and times t41 to t44 of FIG. 25 is similar to the processing at the times t1 to t9 and the times t41 to t44 of FIG. 11, and thus description is omitted.

After the time t44, at a time t60, the sensor controller 243 generates the ST_ADR signal that indicates an address ADR [N+8] as the start address of the invalid shutter row address, and the ED_ADR signal that indicates the address ADR [N+8] as the end address of the invalid shutter row address.

Further, at a time t60, the sensor controller 243 causes the RTRG signal to transition from 0 to 1. Accordingly, the reading operation is started.

At a time t61, the sensor controller 243 causes the SLCNCL signal to transition from 0 to 1. Accordingly, only the S-R latch circuit 123 that holds the address ADR [N+8] as the shutter row address, of all of the S-R latch circuits 123, is reset.

At a time t62, the sensor controller 243 causes the RTRG signal to transition from 1 to 0. Accordingly, the reading operation is terminated. At a time t63, the sensor controller 243 causes the SLCNCL signal to transition from 1 to 0. At a time t64, the sensor controller 243 causes the RSEL signal to transition from 1 to 0, and then the next horizontal scanning period t+1 is started.

As described above, the CMOS image sensor 240 specifies the reading row address of the second group as the invalid shutter row address in the horizontal scanning period of the first group. Therefore, in the horizontal scanning period of the first group, the electric charge of the pixels 51 of the row of the reading row address of the second group is not destroyed, and the CMOS image sensor 240 can output a high-quality pixel signal.

Figure 26:
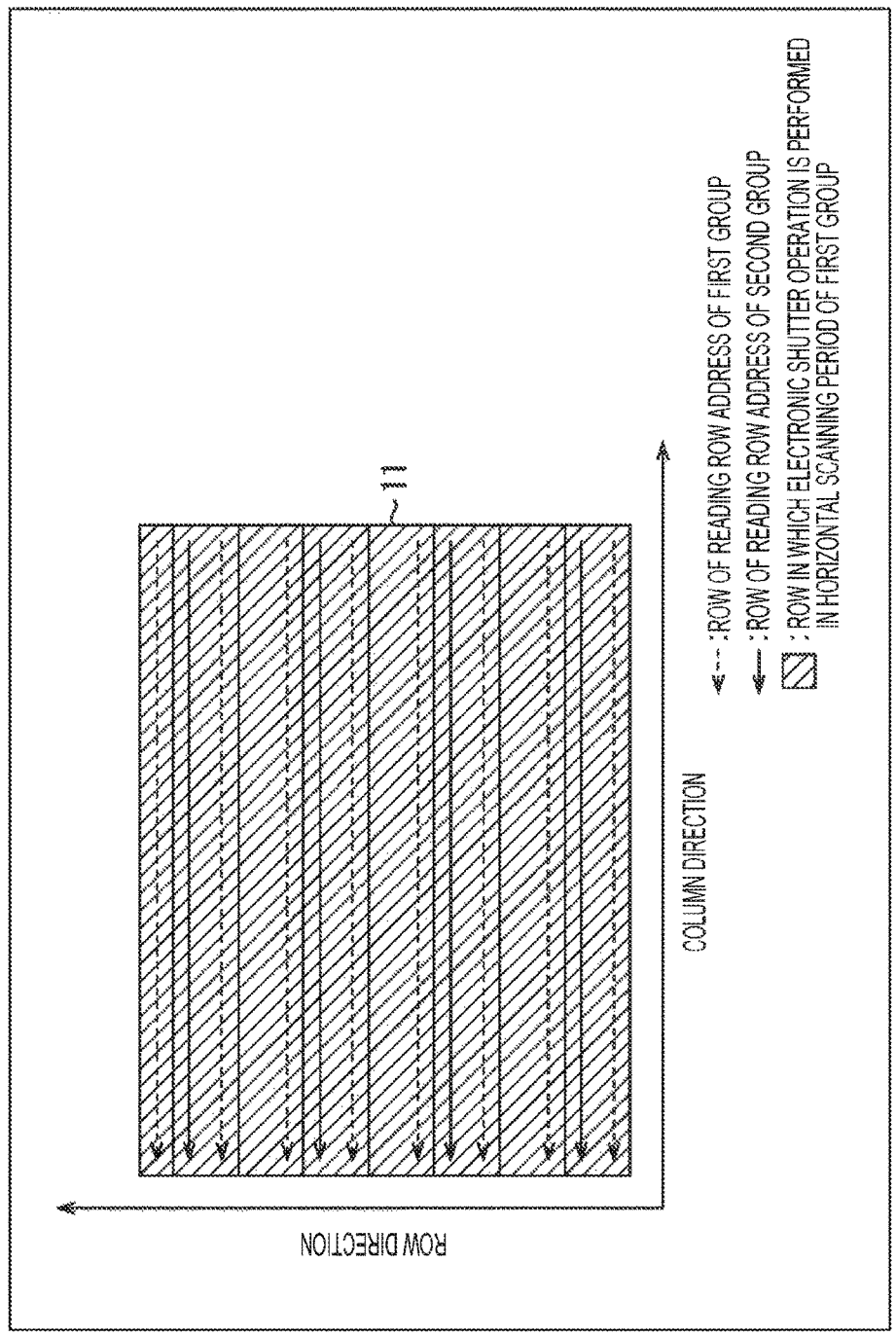
FIG. 26 is a diagram for describing rows in which an electronic shutter operation is performed in a horizontal scanning period of a first group.

In contrast, as illustrated in FIG. 26, when the electronic shutter operation of all of the rows of the pixels 51 arranged in the pixel array 11 is performed in the horizontal scanning periods of the first group, the electric charge accumulated in the pixels 51 of the rows of the reading row addresses of the second group is destroyed. That is, the horizontal scanning period of the first group is a period in which the pixels 51 of the row of the reading row address of the second group accumulates the electric charge, and if the electronic shutter operation is performed in the pixels 51 in the period, the electric charge supposed to be accumulated is discharged. As a result, the quality of the pixel signal is decreased.

Figure 27:
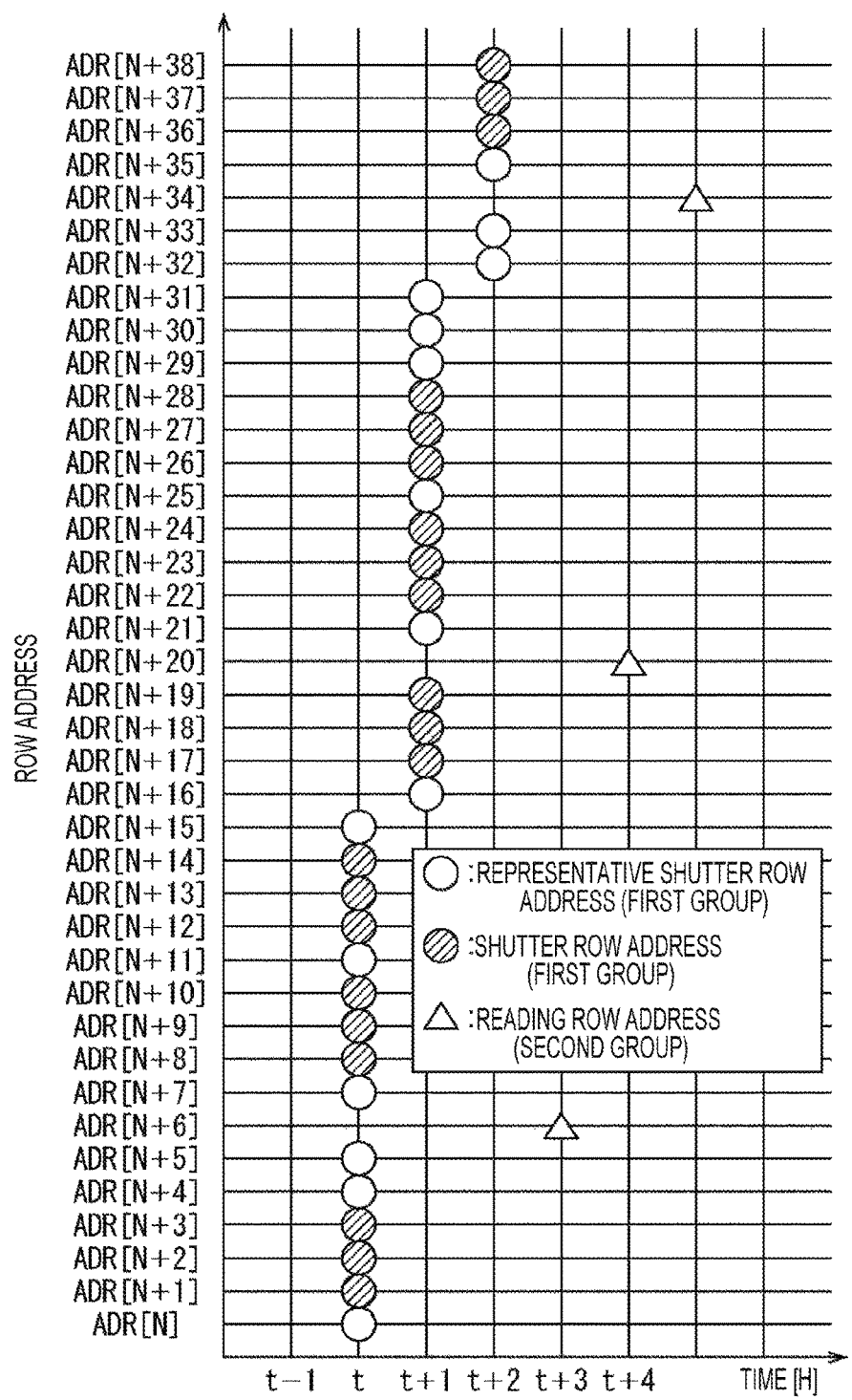
FIG. 27 is a diagram for describing representative shutter row addresses and generated shutter row addresses of the first group, and reading row addresses of a second group.

Further, when imaging control similar to that of the CMOS image sensor 240 of FIG. 20 is performed in the CMOS image sensor 10 of FIG. 1, representative shutter row addresses of the first group, the generated shutter row addresses, and the reading row addresses of the second group are as illustrated in FIG. 27.

In FIG. 27, the white circles represent the representative shutter row addresses specified by the sensor controller 20 in the horizontal scanning periods of the first group. The shaded circles represent addresses not the representative shutter row address, of the shutter row addresses generated by the vertical selection decoder 14, in the horizontal scanning periods of the first group. The triangles represent the reading row addresses specified by the sensor controller 20 in the horizontal scanning periods of the second group.

As illustrated in FIG. 27, since the shutter row addresses in the horizontal scanning periods t to t+2 in the first group are not successive, the sensor controller 20 needs to specify a larger number of representative shutter row addresses than the case of FIG. 4.

For example, in the horizontal scanning period t, the addresses other than the address ADR [N+6] as the reading row address of the second group, of the addresses ADR [N] to ADR [N+15], need to be generated as the shutter row addresses. Therefore, the sensor controller 20 generates the ADR signal that specifies six addresses made of the addresses ADR [N], ADR [N+4], ADR [N+5], ADR [N+7], ADR [N+11], and ADR [N+15], as the representative shutter row addresses.

Figure 28:
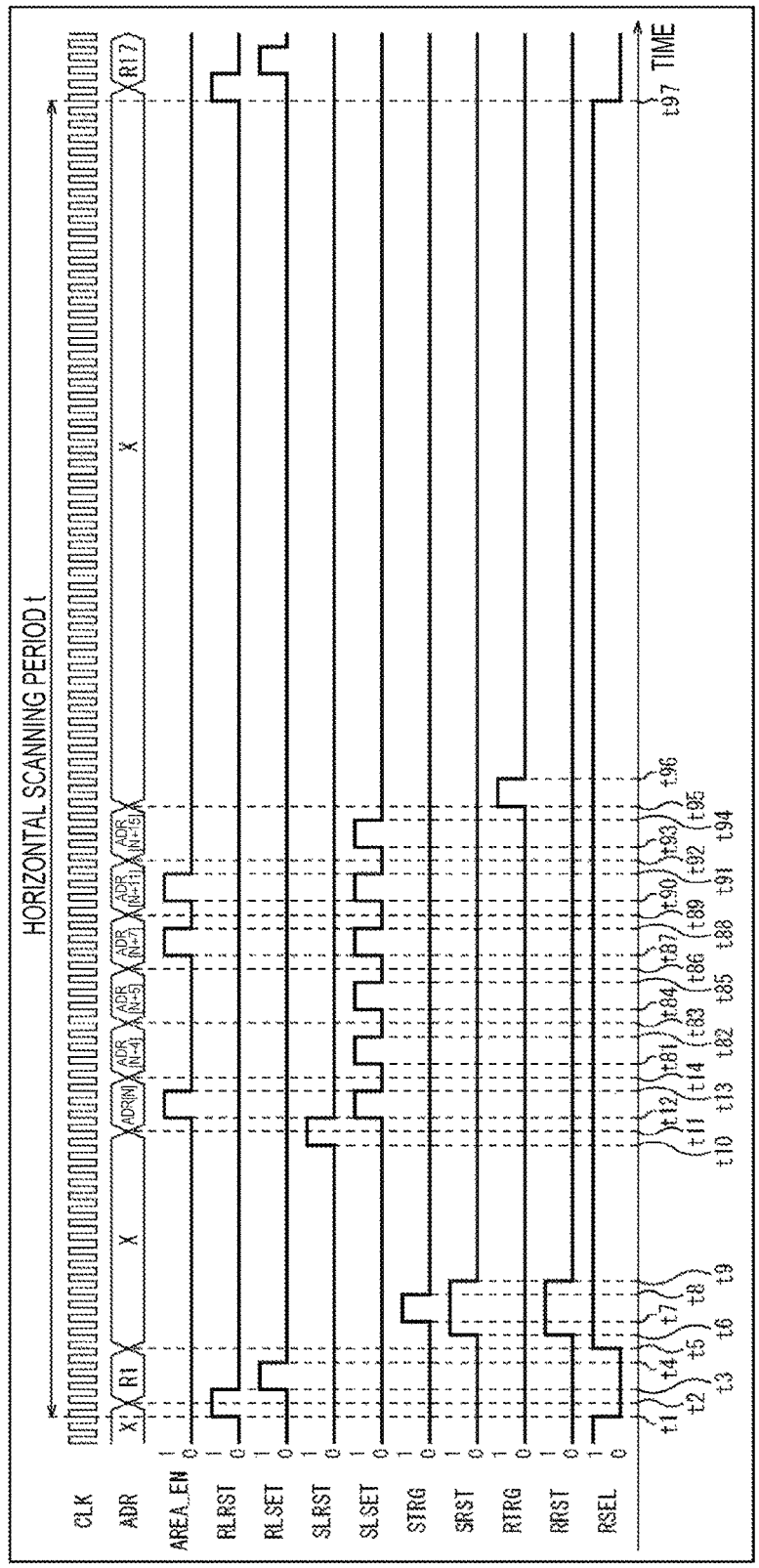
FIG. 28 is a timing chart illustrating another example of timing of various signals generated by a sensor controller of FIG. 1.

Further, a timing chart illustrating an example of timing of various signals generated by the sensor controller 20 in this case is illustrated in FIG. 28.

The various signals at times t1 to t14 of FIG. 28 are similar to the various signals at the times t1 to t14 of FIG. 6, and thus description is omitted.

At a time t81, the sensor controller 20 causes the SLSET signal to transition from 0 to 1, but maintains the AREA_EN signal to 0. Accordingly, 1 is output and held only in the S-R latch circuit 123 of the address ADR [N+4], of all of the S-R latch circuits 123. At a time t82, the sensor controller 20 causes the SLSET signal to transition from 1 to 0.

At a time t83, the sensor controller 20 generates the ADR signal that specifies the address ADR [N+5] as the representative shutter row address. At times t84 and t85, the sensor controller 20 causes the SLSET signal to transition from 0 to 1, and from 1 to 0, similarly to the times t81 and t82. Accordingly, 1 is output and held only in the S-R latch circuit 123 of the address ADR [N+5], of all of the S-R latch circuits 123.

At a time t86, the sensor controller 20 generates the ADR signal that specifies the address ADR [N+7] as the representative shutter row address. At times t87 and t88, the sensor controller 20 causes the AREA_EN signal and the SLSET signal to transition from 0 to 1, and from 1 to 0, similarly to the times t12 and t13. Accordingly, 1 is output and held only in the S-R latch circuits 123 of the addresses ADR [N+7] to ADR [N+10], of all of the S-R latch circuits 123.

At a time t89, the sensor controller 20 generates the ADR signal that specifies the address ADR [N+11] as the representative shutter row address. At times t90 and t91, the sensor controller 20 causes the AREA_EN signal and the SLSET signal to transition from 0 to 1, and from 1 to 0, similarly to the times t12 and t13. Accordingly, 1 is output and held only in the S-R latch circuits 123 of the addresses ADR [N+11] to ADR [N+14], of all of the S-R latch circuits 123.

At a time t92, the sensor controller 20 generates the ADR signal that specifies the address ADR [N+15] as the representative shutter row address. At times t93 and t94, the sensor controller 20 causes the SLSET signal to transition from 0 to 1, and from 1 to 0, similarly to the times t81 and t82. Accordingly, 1 is output and held only in the S-R latch circuit 123 of the address ADR [N+15], of all of the S-R latch circuits 123.

At a time t95, the sensor controller 20 causes the RTRG signal to transition from 0 to 1, similarly to the time t23. As a result the reading operation is started. At a time t96, the sensor controller 20 causes the RTRG signal to transition from 1 to 0, similarly to the time t24. Accordingly, the reading operation is terminated. At a time t97, the sensor controller 20 causes the RSEL signal to transition from 1 to 0, similarly to the time t25. Then, the next horizontal scanning period t+1 is started.

As described above, the CMOS image sensor 10 cannot specify the invalid shutter row address. Therefore, the addresses other than the reading row addresses of the second group, of the shutter row addresses in the horizontal scanning periods of the first group, need to be set as the shutter row addresses. Therefore, specification of the representative shutter row addresses becomes complicated, and the time to set the shutter row addresses (the time from the time t10 to the time t95 in the example of FIG. 28) becomes longer than that of the CMOS image sensor 240.

That is, the CMOS image sensor 10 needs to specify the addresses other than the invalid shutter row addresses, of the shutter row addresses in the horizontal scanning periods of the first group, in units of four addresses. However, the CMOS image sensor 240 is only required to specify the start address and the end address of the shutter row addresses and the invalid shutter row address in the horizontal scanning period of the first group. Therefore, the number of addresses specified in the CMOS image sensor 240 becomes smaller than the number of addresses specified in the CMOS image sensor 10, and the time to set the shutter row addresses is shortened.

(Description of Processing of CMOS Image Sensor)

Figure 29:
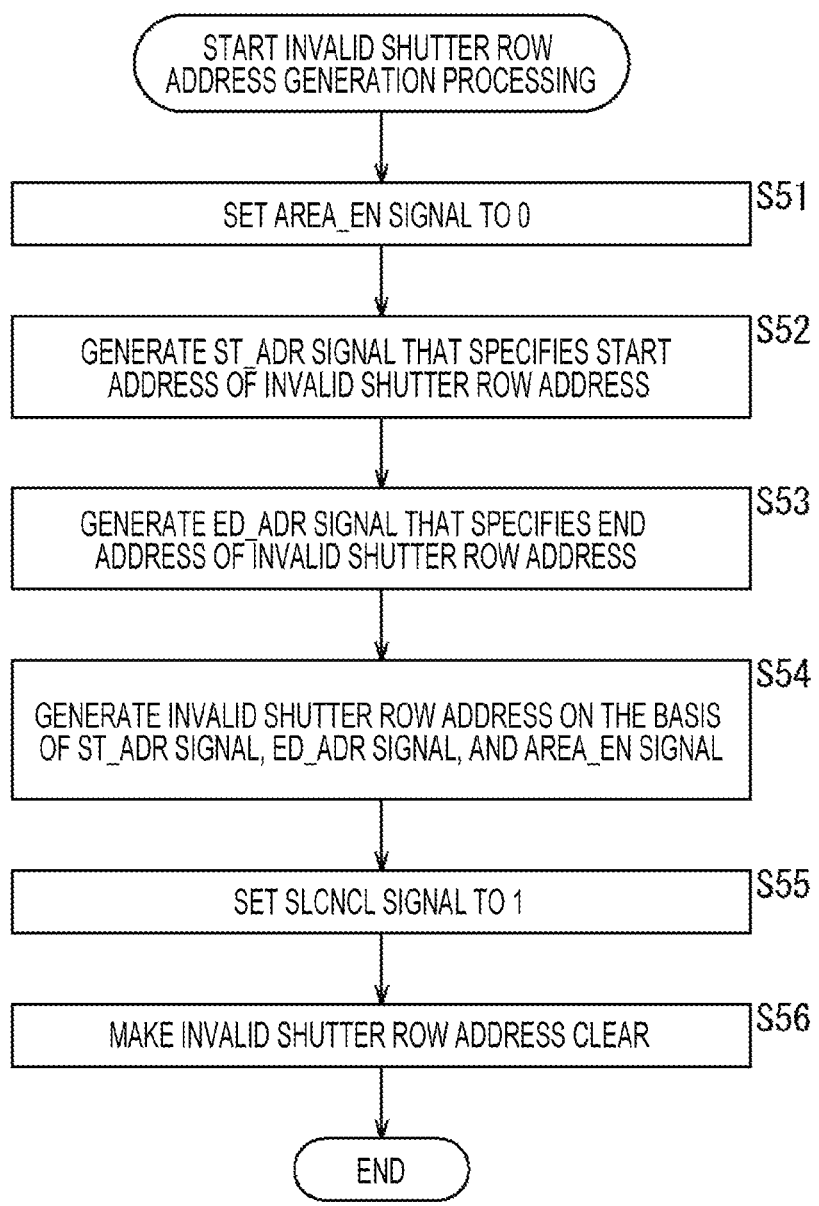
FIG. 29 is a flowchart for describing invalid shutter row address generation processing of the CMOS image sensor of FIG. 20.
Figure 30:
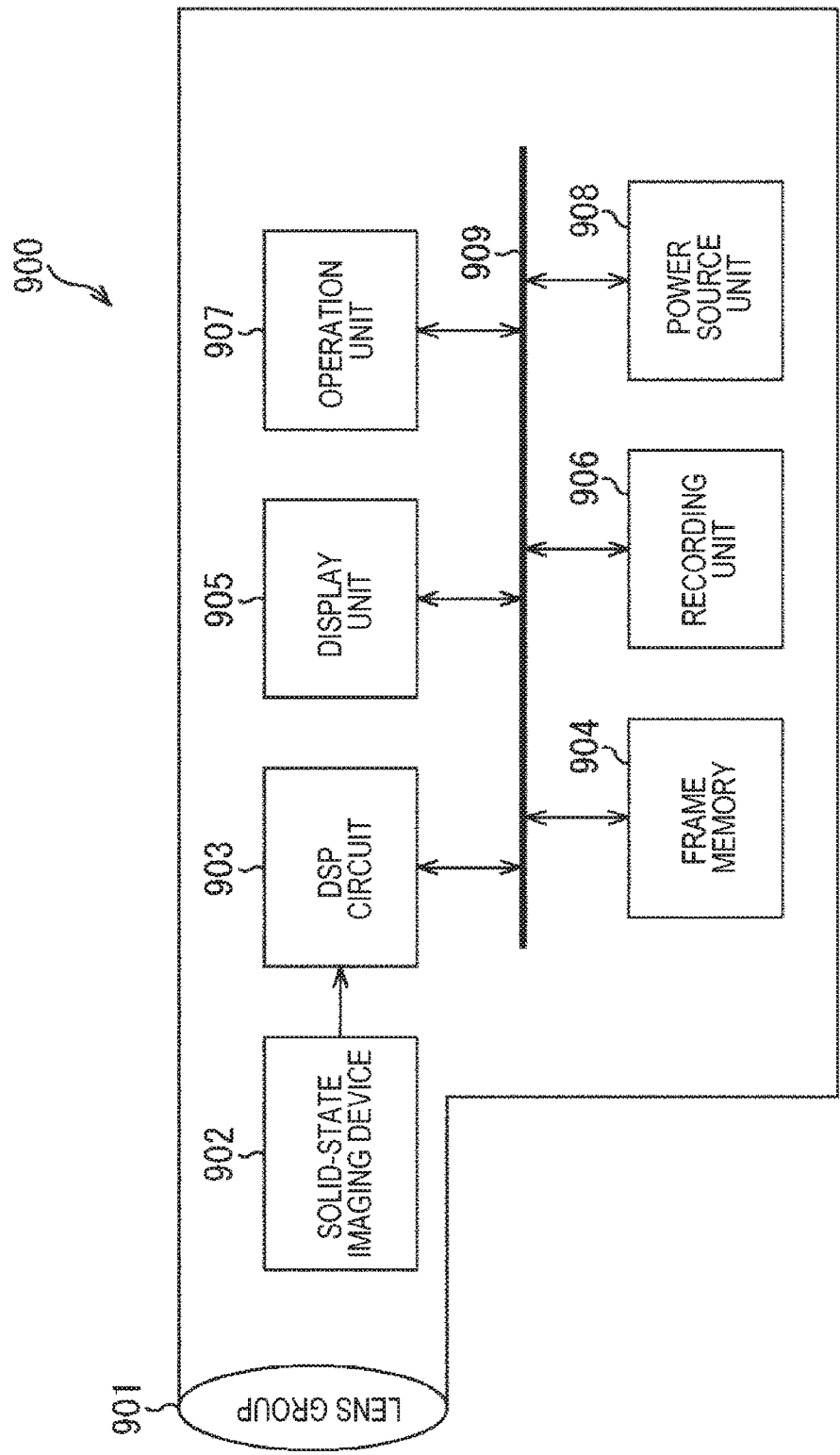
FIG. 30 is a block diagram illustrating a configuration example of one embodiment of a solid-state imaging device to which the present disclosure is applied.

FIG. 29 is a flowchart for describing the invalid shutter row address generation processing of the CMOS image sensor 240 of FIG. 20. This invalid shutter row address generation processing is started when the CMOS image sensor 240 performs similar processing to the shutter row address generation processing of FIG. 12, for example, and causes the latch circuit 242 to hold the shutter row addresses obtained as a result of the processing.

In step S51 of FIG. 29, the sensor controller 243 sets the AREA_EN signal to 0, and supplies the signal to the vertical selection decoder 241. In step S52, the sensor controller 243 of the CMOS image sensor 240 generates the ST_ADR signal that specifies the start address of the invalid shutter row address, and supplies the generated signal to the vertical selection decoder 241.

In step S53, the sensor controller 243 generates the ED_ADR signal that specifies the end address of the invalid shutter row address, and supplies the generated signal to the vertical selection decoder 241. In step S54, the vertical selection decoder 241 generates the invalid shutter row address on the basis of the ST_ADR signal, the ED_ADR signal, and the AREA_EN signal, and supplies the generated address to the latch circuit 242.

In step S55, the sensor controller 243 sets the SLCNCL signal to 1. In step S56, the latch circuit 242 makes the invalid shutter row address clear, of the shutter row addresses held in the latch circuit 242, by shutter row address generation processing on the basis of the SLCNCL signal. To be specific, the S-R latch circuit 123 of the invalid shutter row address is reset. Then, the processing is terminated.

As described above, the CMOS image sensor 240 specifies the reading row address of the second group as the invalid shutter row addresses in the horizontal scanning period of the first group. Therefore, in the horizontal scanning period of the first group, the accumulated electric charge of the pixels 51 of the reading row address of the second group is not destroyed, and the quality of the pixel signal can be improved.

Note that the number of groups of the rows of the pixels 51 is not limited to two as long as there is a plurality of groups.

Fifth Embodiment (Configuration Example of Embodiment of Solid-state Imaging Device)

FIG. 30 is a block diagram illustrating a configuration example of an embodiment of a solid-state imaging device to which the present disclosure is applied.

A solid-state imaging device 900 of FIG. 30 is a video camera, a digital still camera, or the like. The solid-state imaging device 900 is made of a lens group 901, a solid-state imaging device 902, a DSP circuit 903, a frame memory 904, a display unit 905, a recording unit 906, an operation unit 907, and a power source unit 908. The DSP circuit 903, the frame memory 904, the display unit 905, the recording unit 906, the operation unit 907, and the power source unit 908 are connected to one another through a bus line 909.

The lens group 901 takes in incident light (image light) from an object, and forms an image on an imaging surface of the solid-state imaging device 902. The solid-state imaging device 902 is made of the above-described CMOS image sensor 150 (200, 220, or 240). The solid-state imaging device 902 converts a light amount of the incident light formed on the imaging surface by the lens group 901 into an electrical signal in units of a pixel, and supplies the converted signal to the DSP circuit 903 as a pixel signal.

The DSP circuit 903 performs predetermined image processing for the pixel signal supplied from the solid-state imaging device 902, supplies an image signal after the image processing to the frame memory 904 in units of frames, and causes the frame memory 904 to temporarily store the image signal.

The display unit 905 is made of a panel-type display device such as a liquid crystal panel or an organic electro luminescence (EL) panel, and displays an image on the basis of the pixel signal in units of a frame temporarily stored in the frame memory 904.

The recording unit 906 is made of a digital versatile disk (DVD), a flash memory, or the like, and reads and records the pixel signal in units of a frame temporarily stored in the frame memory 904.

The operation unit 907 issues operation commands about various functions held by the solid-state imaging device 900 under an operation by a user. The power source unit 908 appropriately supplies a power source to the DSP circuit 903, the frame memory 904, the display unit 905, the recording unit 906, and the operation unit 907.

The solid-state imaging device to which the present technology is applied may just be a device using a CMOS image sensor in an image take-in unit (photoelectric conversion unit), and examples of the solid-state imaging device include a portable terminal device having an imaging function, and a copier using a CMOS image sensor in an image reading unit, in addition to the solid-state imaging device 900.

Note that the effects described in the present specification are merely examples and are not limited. Other effects may be exhibited.

Further, embodiments of the present disclosure are not limited to the above-describe embodiments, and various changes can be made without departing from the gist of the present disclosure.

For example, in the fourth embodiment, the AREA_EN signal may not be generated, similarly to the second embodiment, or the vertical selection decoder that generates the shutter row addresses and the vertical selection decoder that generates the reading row address may be separately provided, similarly to the third embodiment.

Note that the present disclosure can have configurations below.

(1)
A control device including:
an address setting unit configured to set shutter row addresses that identify rows of pixels for which an electronic shutter operation is performed, of pixels arranged in a matrix manner, on the basis of a start address and an end address of the shutter row addresses.

(2)
The control device according to (1), wherein the address setting unit is configured to set a reading row address that identifies a row of pixels from which a pixel signal is read, of the pixels arranged in a matrix manner, on the basis of a start address and an end address of the reading row address.

(3)
The control device according to (1) or (2), wherein the address setting unit is configured to set the shutter row addresses on the basis of the start address, the end address, and a signal that makes simultaneous generation of a plurality of addresses valid.

(4)
The control device according to (1) or (2), wherein the address setting unit is configured to set the shutter row addresses other than an invalid shutter row address that identifies a row of pixels for which the electronic shutter operation is made invalid, of rows identified by the shutter row addresses, on the basis of the invalid shutter row address, the start address, and the end address.

(5)
A control method including:
an address setting step of setting, by a control device, shutter row addresses that identify rows of pixels for which an electronic shutter operation is performed, of pixels arranged in a matrix manner, on the basis of a start address and an end address of the shutter row addresses.

(6)
A solid-state imaging device including:
pixels arranged in a matrix manner; and
an address setting unit configured to set shutter row addresses that identify rows of pixels for which an electronic shutter operation is performed, of the pixels arranged in a matrix manner, on the basis of a start address and an end address of the shutter row addresses.

REFERENCE SIGNS LIST

15 Latch circuit
51 Pixel
150 CMOS image sensor
151 Vertical selection decoder
900 Solid-state imaging device

What is claimed is:
1. A control device comprising:
an address setting unit comprising a vertical selection decoder and a latch circuit, the address setting unit configured to set shutter row addresses for a plurality of shutter rows during one horizontal scanning period, wherein the shutter row addresses identify consecutive rows of pixels for which an electronic shutter operation is performed, wherein the pixels are arranged in a matrix and are connected to the address setting unit via a vertical drive circuit and a horizontal selection line, wherein the shutter row addresses of a first shutter row of the plurality of shutter rows are set based on a start address signal and an end address signal received from a sensor controller, wherein the shutter row addresses between the start address and the end address are set as consecutive shutter row addresses.

2. The control device according to claim 1, wherein the address setting unit is configured to set a reading row address that identifies a row of pixels, of the pixels arranged in a matrix, from which a pixel signal is read based on a start address and an end address of the reading row address.

3. The control device according to claim 1, wherein the shutter row addresses of the first shutter row of the plurality of shutter rows are set further based on a signal that makes simultaneous generation of a plurality of addresses valid.

4. The control device according to claim 1, wherein the address setting unit is configured to set the shutter row addresses, other than an invalid shutter row address that identifies a row of pixels for which the electronic shutter operation is made invalid, of rows identified by the shutter row addresses, wherein the shutter row addresses are set based on the invalid shutter row address, the start address of the shutter row address, and the end address of the shutter row address.

5. A control method comprising:
receiving a start address signal and an end address signal from a sensor controller; and
setting, by an address setting unit comprising a vertical selection decoder and a latch circuit, shutter row addresses for a plurality of shutter rows during one horizontal scanning period, wherein the shutter row addresses identify consecutive rows of pixels for which an electronic shutter operation is performed, wherein the pixels are arranged in a matrix and are connected to the address setting unit via a vertical drive circuit and a horizontal selection line, wherein the shutter row addresses of a first shutter row of the plurality of shutter rows are set based on the start address signal and the end address signal, wherein the shutter row addresses between the start address and the end address are consecutive shutter row addresses.

6. A solid-state imaging device comprising:
pixels arranged in a matrix; and
an address setting unit comprising a vertical selection decoder and a latch circuit, the address setting unit configured to set shutter row addresses for a plurality of shutter rows during one horizontal scanning period, wherein the shutter row addresses identify consecutive rows of pixels for which an electronic shutter operation is performed, wherein the pixels are connected to the address setting unit via a vertical drive circuit and a horizontal selection line, wherein the shutter row addresses of a first shutter row of the plurality of shutter rows are set based on a start address signal and an end address signal received from a sensor controller, wherein the shutter row addresses between the start address and the end address are consecutive shutter row addresses.

7. The control device according to claim 1, wherein the shutter row addresses for the plurality of shutter rows are set simultaneously during the one horizontal scanning period.

8. The control method according to claim 5, wherein the shutter row addresses for the plurality of shutter rows are set simultaneously during the one horizontal scanning period.

9. The solid-state imaging device according to claim 6, wherein the shutter row addresses for the plurality of shutter rows are set simultaneously during the one horizontal scanning period.

\* \* \* \* \*